US012576531B1

(12) United States Patent
Zhang

(10) Patent No.: US 12,576,531 B1
(45) Date of Patent: Mar. 17, 2026

(54) MOBILE ROBOT SYSTEM FOR HANDLING RAILWAY IBC

(71) Applicant: Ming Zhang, Montreal (CA)

(72) Inventor: Ming Zhang, Montreal (CA)

( * ) Notice: Subject to any disclaimer, the term of this patent is extended or adjusted under 35 U.S.C. 154(b) by 879 days.

(21) Appl. No.: 17/535,857

(22) Filed: Nov. 26, 2021

(51) Int. Cl.
| | |
|---|---|
| *B25J 9/16* | (2006.01) |
| *B25J 5/00* | (2006.01) |
| *B25J 15/00* | (2006.01) |
| *B25J 19/00* | (2006.01) |
| *B61D 15/00* | (2006.01) |
| *B66F 7/06* | (2006.01) |

(52) U.S. Cl.
CPC ............. *B25J 9/1682* (2013.01); *B25J 5/007* (2013.01); *B25J 9/1697* (2013.01); *B25J 15/0004* (2013.01); *B25J 19/0075* (2013.01); *B25J 19/0091* (2013.01); *B61D 15/00* (2013.01); *B66F 7/0666* (2013.01)

(58) Field of Classification Search
CPC ........ B25J 9/1682; B25J 5/007; B25J 9/1697; B25J 15/0004; B25J 19/0075; B25J 19/0091; B61D 15/00; B66F 7/0666
See application file for complete search history.

(56) References Cited

U.S. PATENT DOCUMENTS

| | | | | |
|---|---|---|---|---|
| 2008/0286074 A1* | 11/2008 | Chellappa | ............ | B65D 90/002 |
| | | | | 414/140.3 |
| 2015/0122288 A1* | 5/2015 | Eriksson | ................ | B24C 3/325 |
| | | | | 901/41 |

FOREIGN PATENT DOCUMENTS

| | | | | |
|---|---|---|---|---|
| WO | WO-2012141658 A2 * | 10/2012 | ........... | B65D 90/002 |

* cited by examiner

*Primary Examiner* — Nhi Q Bui

(57) ABSTRACT

Disclosed is a mobile robot manipulator system for handling railway inter box connectors for securement of shipping containers to the intermodal railcars, in a railway yard under an outdoor working environment, with a unique end-effector design incorporating at least two independently actuated and redundant grippers, supplemented by an additional aerial lift and aerial anchor to help stabilize the position of the movable base of the manipulator, a manipulator docking station to help protect the manipulator, end-effector, vision camera, and other sensitive equipment from damages against shock and under all weather conditions, and a sure grip methodology for safely transporting the railway inter box connector by the robot manipulator.

20 Claims, 14 Drawing Sheets

(a)          (b)          (c)          (d)

(a)          (b)          (c)

(a)

(b)

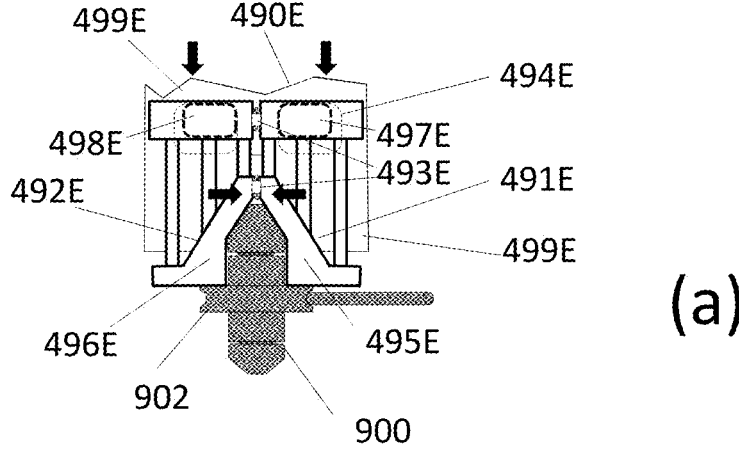
(a)
FIG. 4E
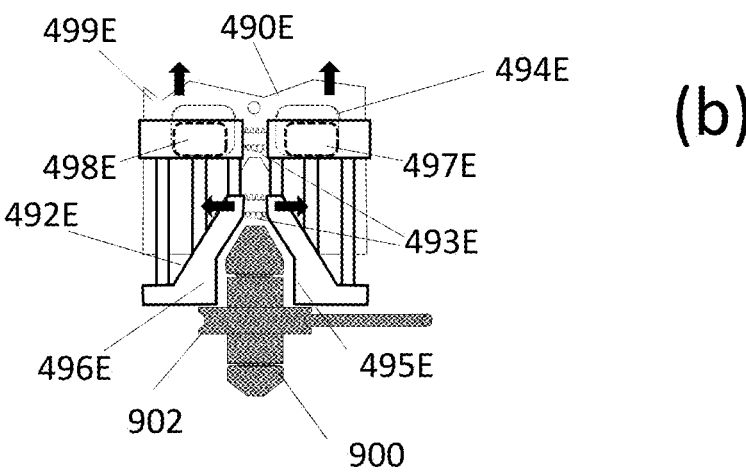
(b)

MOBILE ROBOT SYSTEM FOR HANDLING RAILWAY IBC

CROSS-REFERENCE TO RELATED APPLICATIONS

This application claims priority to U.S. Patent Application Ser. No. 63/232,153, entitled "Unmanned handling of railway interbox connector", filed 11 Aug. 2021, Ser. No. 63/234,864, entitled "Unmanned handling of railway interbox connector", filed 19 Aug. 2021, Ser. No. 63/239,933, entitled "Mobile Robot System for Handling Railway IBC", filed 1 Sep. 2021, the entire subject matter of which is hereby incorporated by reference.

FIELD OF THE INVENTION

The present invention relates generally to the field of automation of railway operation. More particularly, the invention relates to the application of an unmanned mobile robot manipulator for automatic handling of railway inter box connectors, referred herein afterward as IBC, for securement of a top shipping container to a bottom shipping container carried by a well type intermodal railcar.

BACKGROUND OF THE INVENTION

Modern intermodal railway freight transport uses railcars to carry two layers of cargo containers to be stacked one on top of another, often referred to as double-stack rail transport. While the bottom container is secured within the rail car, the top container must be secured safely with the bottom container using inter box connectors, referred herein afterward as IBCs.

The shipping containers, dry or liquid type, that railcars transport are typical of standardized size and shape with standardized corner castings for interconnections using IBC and other types of connectors. Two types of IBC have been approved by AAR and north American railroads, the manual IBC that is used in the majority of cases and the semiautomatic/automatic IBC that is used on a limited trial basis.

The handling of IBC has been a heavy burden and roadblock for other efforts to automate the railway yard operation dealing with shipping containers. The burden consists of the labor cost and loss of operational efficiency due to the manual process steps to lock, unlock, place, and remove those IBCs in every step of container loading and unloading. Furthermore, wherever there is a manual IBC handling, the present railroad safety codes forbid any pass of crane trolleys therefore a safety exclusion zone must be created.

The steps of manual handling of IBC by a groundsman in an intermodal yard include:

- climbing up the side of the bottom container in each car to place IBC into each corner casting of the bottom container during container loading;
- manually locking each IBC by rotating the protruded handler by 90 degrees to their fully locked position after the top container is loaded on top of the bottom container during container loading;
- manually unlocking each IBC by rotating the protruded handler by 90 degrees to their fully unlocked position before the cranes can lift the top container from the railcar;

- removing the IBCs from each corner casting of the bottom container before the bottom container can be unloaded from the railcar or transported to other locations;
- certain logistics of IBCs within the railway yard to prevent loss and eliminate safety hazards.

Not only time and labor-consuming, but such a manual operation is also dangerous, particularly in bad weather, being a source of injuries or casualties. Some railroads use diesel-powered raised deck mobile carts driven by a groundsman known as cone cart grunt to perform the IBC related handling. Nevertheless, the safety risk and operational inefficiency remain. There has been a strong desire in intermodal terminals to introduce automation of manual handling of the IBCs.

Attempts to develop automatic IBC operation devices onboard railcars may save the precious spaces in the yards and be realized efficiently on all cars simultaneously. However extra tare weight added to the moving transport equipment is never desirable, especially for the profit-driven freight transport system.

Nowadays robot fabrication performing many repetitive functions including pick-and-place in a controlled indoor environment is common and referred to as the application of stationary industrial robots along a production line or production site that operate under fixed conditions with a limited working area guarded by a safety fence. Unfortunately, such a mature system is difficult to adapt to fragmented outdoor railway operations.

Numerous attempts have been made in developing new semi or fully automatic IBC or other innovative connector systems, for example, the prior art reference U.S. Pat. No. 9,011,055 "Automatic lock for cargo container", U.S. Pat. No. 9,809,358 "Self-Latching Interbox Connector For Automatic securement of a top container to a bottom container", U.S. Pat. No. 8,342,786 "Container Auto-Lock System", Patent Application #20160251021 "Connector System For Securing Stacked Containers", Patent Application #WO2012141658A2 "Device for handling an inter-box connector", U.S. Pat. No. 10,611,291 "Locking system and method of use".

Unfortunately, none of the above is widely implemented in the railway operation due to many constraints from the legacy issues of a large number of existing IBCs in use, demanding railway safety regulations, and practical railway operation conditions, No filed patents are found dealing with equipment or methodology to automate the manual handling of railway IBC in the rail intermodal terminal. Furthermore, no filed patents are found dealing with any type of shipping container twist lock by using ground mobile robots.

A force-limiting cobot, abbreviation for the collaborative robot manipulator, coupled to an AMR or an AGV, abbreviations for the autonomous mobile robot or the automatic guided vehicle offers in general dexterity and short-range mobility. There exist several mobile manipulation systems that have been successfully applied in controlled indoor environments. However, when the mobile robots are placed in an outdoor environment, technical challenges increase largely in the following aspect:

- limited onboard battery energy, shared already between mobile robots, robot manipulators, as well as end effectors, can be reduced by 80% in cold temperatures, demanding deployment of large and heavy power sources, for example, large-and-heavy diesel engines or electric batteries;
- precise and stable robot manipulation in terms of pose repetitiveness, already difficult to achieve in raised heights above the ground, must be able to withstand a strong wind in an outdoor environment, requiring application of heavyweight lift, heavyweight robot, and heavyweight and large footprint mobile robot. All add burden to the limited power source and affect its operation range and put a strong limitation on the quantity of the spare IBC the mobile system can carry;

service life of the critical components such as lift based on high force linear actuator can be severely affected by the amount of the lateral load presented by the operation of the mobile manipulator;

narrow passage between the rail tracks in the already crowded rail terminal that the designed mobile manipulator must share with human operators, ground wheeled equipment, rubber-tired-gantry cranes/rail-mounted-gantry cranes that forbid the use of large footprint equipment;

scattered target IBC handling locations along the mile-long train that challenge the goal of achieving overall high operational efficiency, preferring a lightweight mobile manipulator capable of displacing swiftly on the ground, aided by a speedy vertical lift at a speed similar to if not higher than human operator at about 1.4 m/s, implying a desired low center of gravity of the proposed mobile manipulator carrying a required number of spare IBCs in a pallet or skid;

long operational time and desired reduction in greenhouse gas (GHG) emission, both favor a lightweight and reliable system instead of a heavyweight system.

Therefore, there is a need for the development of a lightweight and small-footprint mobile robot manipulation system for handling railway IBC handling reliably. Meanwhile, automation of railway IBC by mobile manipulator must also cope with a specific challenge to develop a unique gripper to grasp railway IBC that is made in large tolerances and suffered in rough handling.

SUMMARY OF THE INVENTION

It is an object of the present invention to replace humans with a mobile collaborative robot manipulator system, either remote-controlled or at various levels of autonomy performing placement, removal, locking, and unlocking of the manual railway IBCs in an outdoor rail yard.

It is also an object of the present invention to offer a generally reliable yet lightweight and energy-efficient, mobile robot manipulator, supplemented by an additional aerial lift and aerial anchor to help stabilize the position of the movable base of the manipulator and to achieve required pose repetitiveness at the target locations even in strong wind;

a manipulator docking station to help protect the manipulator. end-effector, vision camera, and other sensitive equipment from damages against vibration or shock received on the bumpy road, as well as hot and cold weather conditions.

In one embodiment, a ground mobile robot manipulator system is provided including a mobile robot or carrier, a scissor lift, an articulated multi-axis robot manipulator with multiple choices of mechanical or magnetic end effectors, a unit load of IBC stored in an IBC holder, and a foldable magnetic stabilizer attached to the base of the manipulator.

In another embodiment, a system of mother carriers and a lightweight mobile manipulator are proposed.

In another embodiment, computer-controlled machinery dedicated to IBC handling on both lateral sides of the shipping container is proposed.

In another embodiment, a ground mobile robot manipulator system is provided including an ARM, a telescoping lift obliquely positioned towards the working side, an articulated force-limiting collaborative robot manipulator with multiple choices of mechanical, magnetic end effectors, integrated robot vision unit, a unit load of IBC stored in an IBC holder at a deck level near the ground to maintain a low center of gravity, a magnetic aerial anchor attached to the top of the telescoping lift where the base of the collaborative robot manipulator is installed and a manipulator docking station capable of anti-vibration and climate-control.

In another embodiment, an IBC workstation built around an existing wayside mobile container lifting equipment such as mobile straddle carriers or mobile cranes with onboard drones (UAV) or industrial robot manipulators is provided.

In another embodiment, a method of sure-grip is provided to transport safely the railway IBC or other workpiece during the movement of the mobile robot or telescoping lift to prevent accidental slipping out of the grip. The method includes flipping over immediately, by the manipulator, the position of railway IBC relative to the end effector after the end effector grasps the railway IBC and holding the IBC on top of the end effector until it arrives at the area on top of the IBC holder, and then flipping over again before finally placing it into the target location.

BRIEF DESCRIPTION OF THE DRAWINGS

Other uses and advantages of the present invention, overcoming the limitation of the prior arts, will become apparent to those skilled in the art upon reference to the specification and the drawings, in which.

the manipulator's capability of placing or removing IBC when the lift extends to its elevated position, as well as the deployment of a lateral magnetic aerial anchor;

the manipulator docking station encasing the manipulator and the end effector against bumpy road vibration and harsh outdoor environment.

Figure 4:
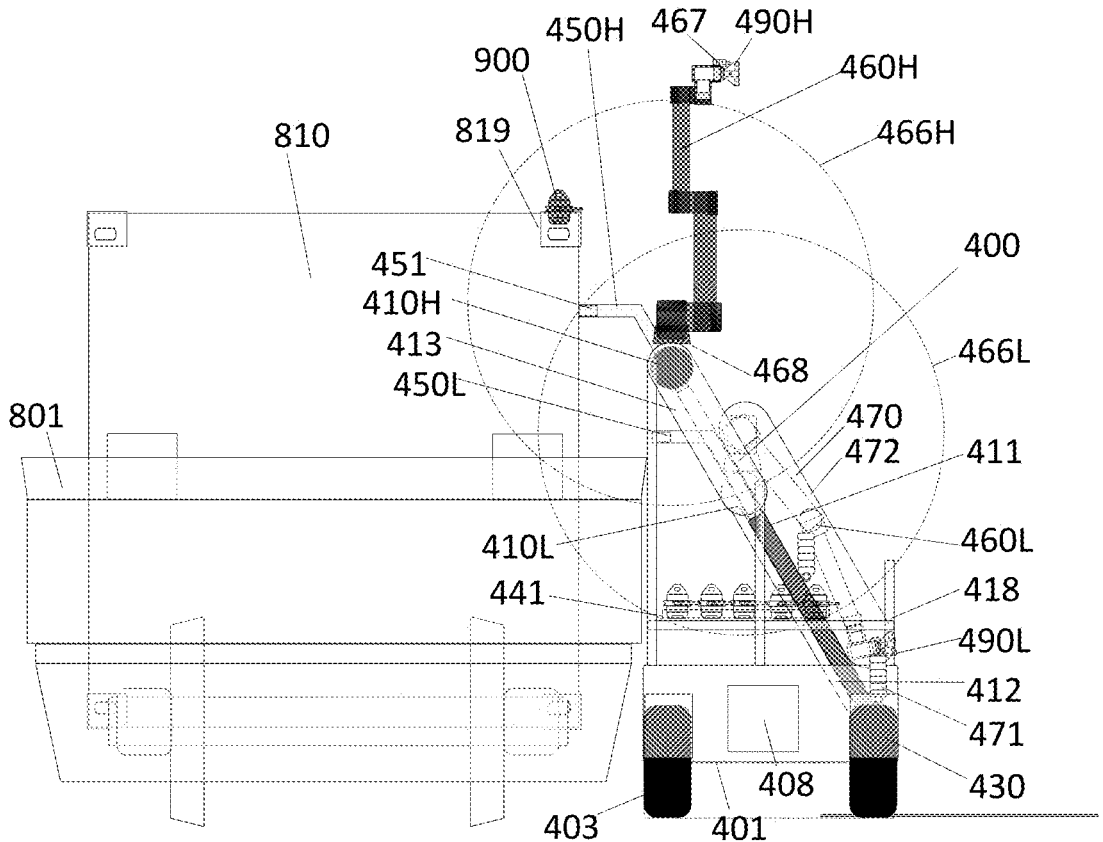
FIG. 4. presents a front view of an alternative ground mobile collaborative robot system equipped with an articulated cobot manipulator mounted on the distal end of an inclined telescoping lift tilting towards the working side, powered by an electric actuator, demonstrating the manipulator's capability of picking-up IBC when the lift retracts.
Figure 4A:
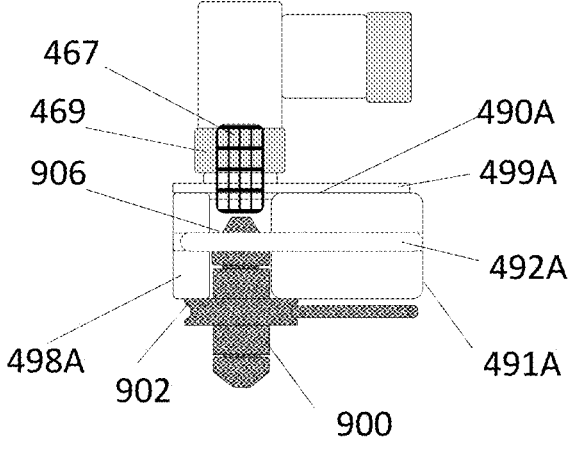

FIG. 4A. presents a close-up view of one servo-electric gripper capable of automatic positioning around the IBC cone, seating against the IBC flange, and holding the IBC by the cone aperture from one side.

Figure 4B:
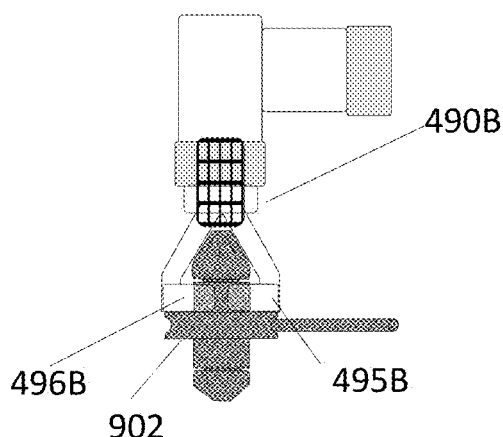

FIG. 4B. presents a close-up view of one magnetic gripper capable of automatic positioning around the IBC and seating against the IBC top flange.

Figures 4C, 4D:
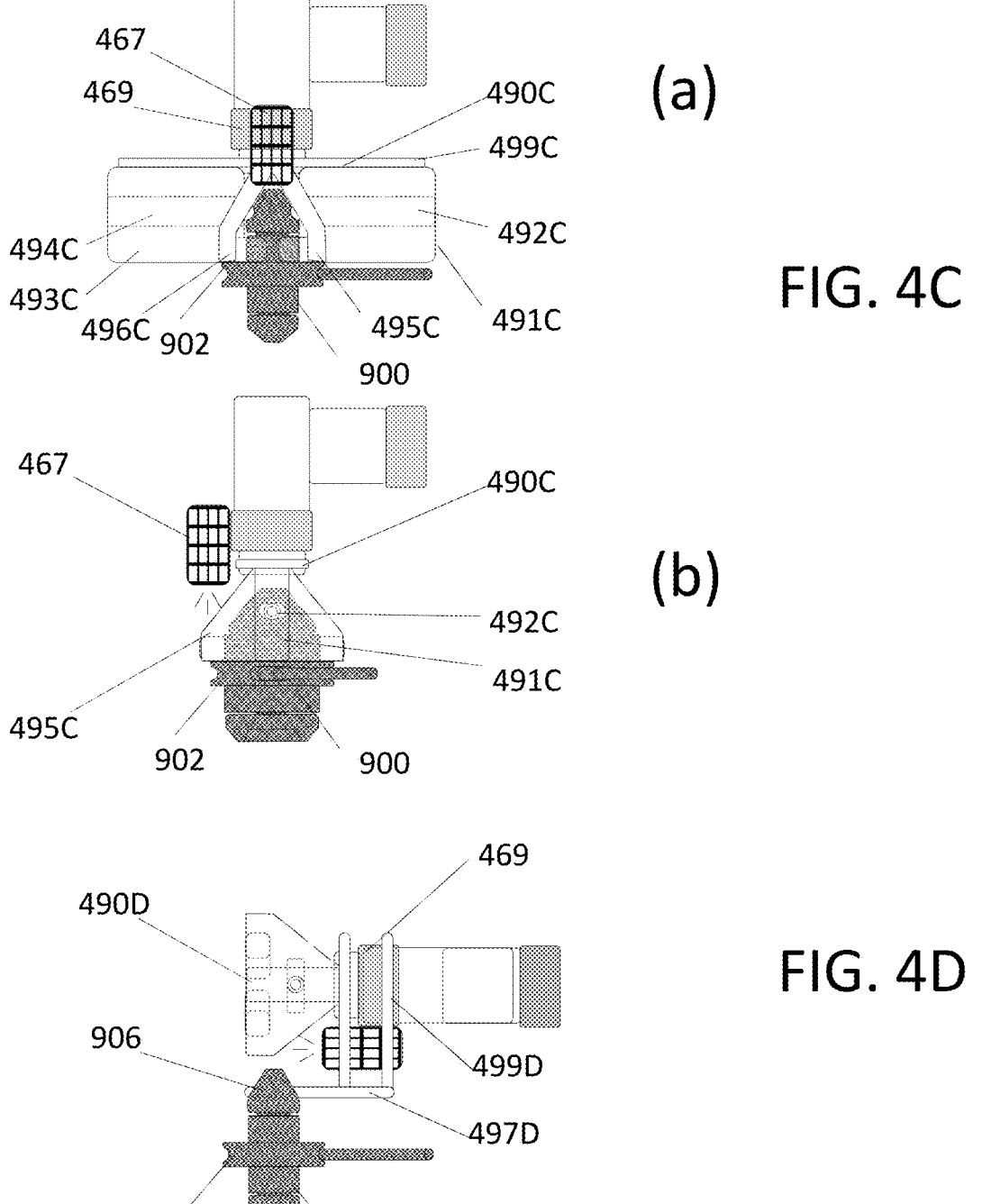

FIG. 4C (a) and (b) present two views of a combined magnetic gripper and a redundant double-sided servo-electric gripper for holding the IBC in case the magnetic gripper fails.

FIG. 4D presents a combined magnetic gripper, a redundant backup double-sided servo-electric gripper, and a secondary backup pin tool for picking up the IBC in case of a gripper failure.

FIG. 4E (a) and (b) presents two views of a pair of wedge clutching magnets capable of maximizing the magnetized contact on the top of the IBC flange by compressing against the IBC cone and flange.

Figure 5:
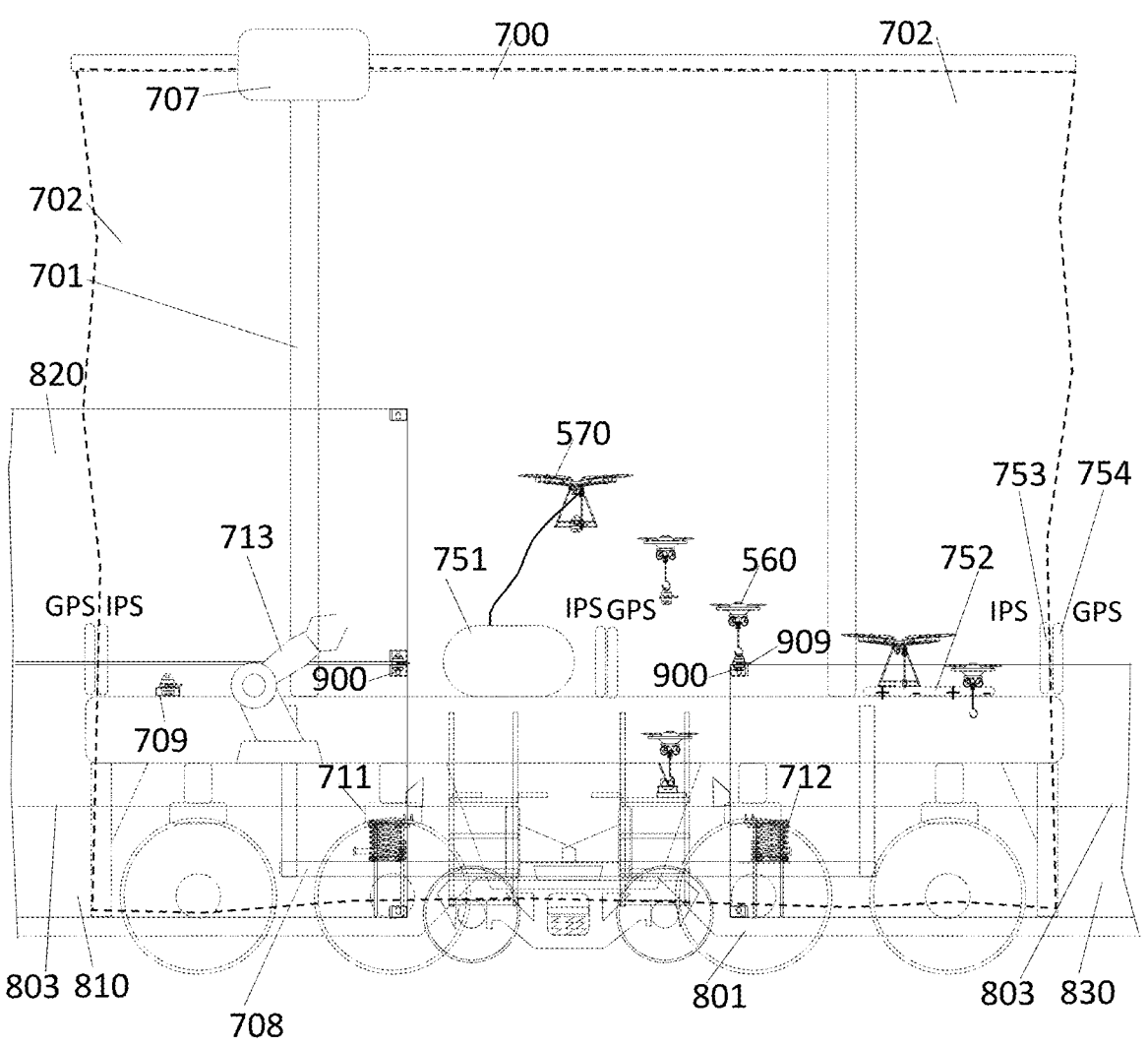

FIG. 5 presents a straddle carrier style IBC mobile workstation for unmanned IBC placement and removal by an onboard UAV or onboard robot arm. The protective enclosure carried by the IBC mobile working station provides shelter, a secure working environment for the UAV and robot. Together with the robust GPS/IPS communication modules, it assures reliable IBC handling under all weather conditions.

Figure 5A:
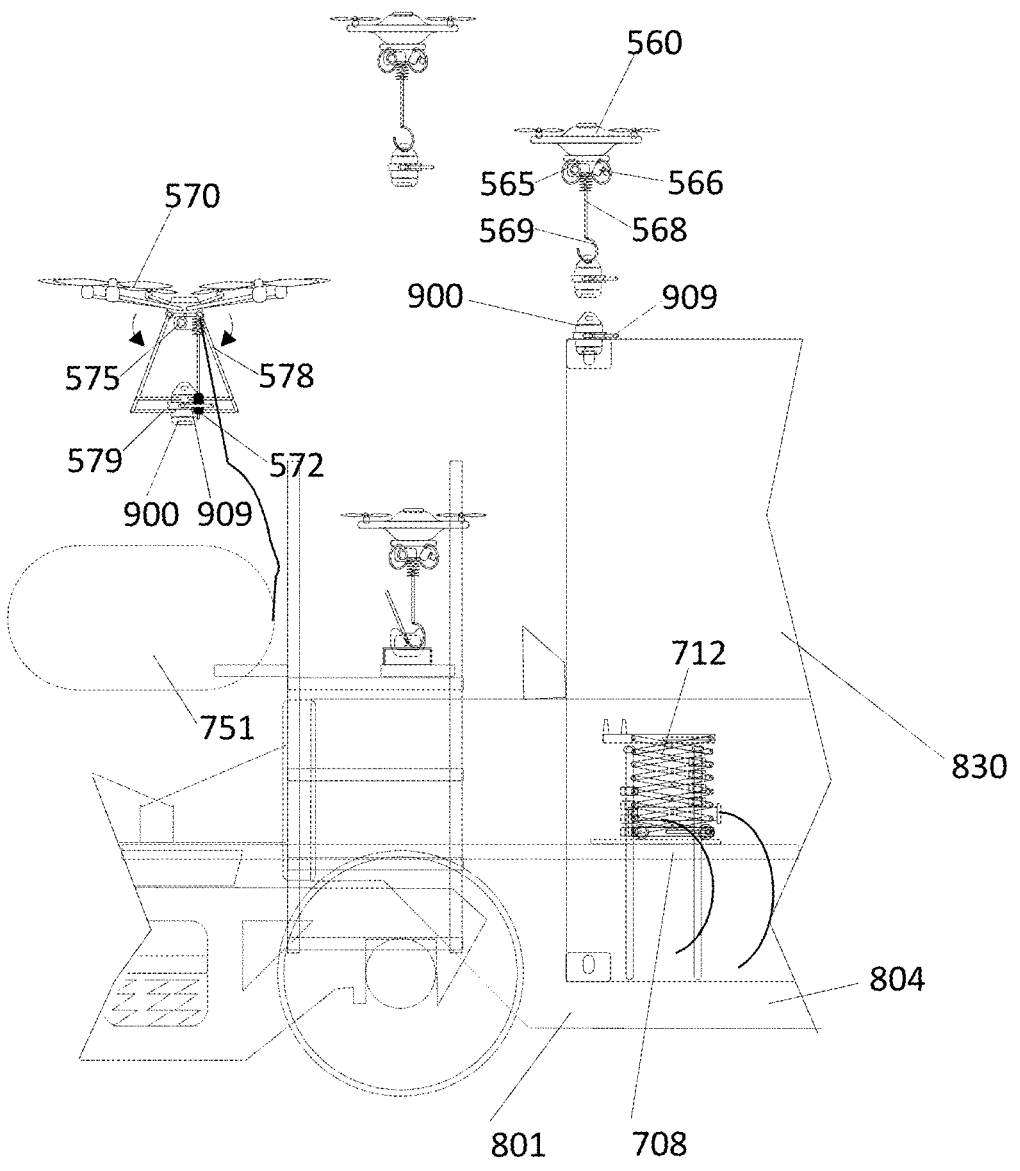

FIG. 5A presents a close-up view of the IBC delivery drones hooking up the IBC by the existing cone aperture at the top of the conventional IBC or clamping the IBC from the sides. It also shows an alternative foldable IBC manipulator for locking and unlocking the IBC.

Figure 1:
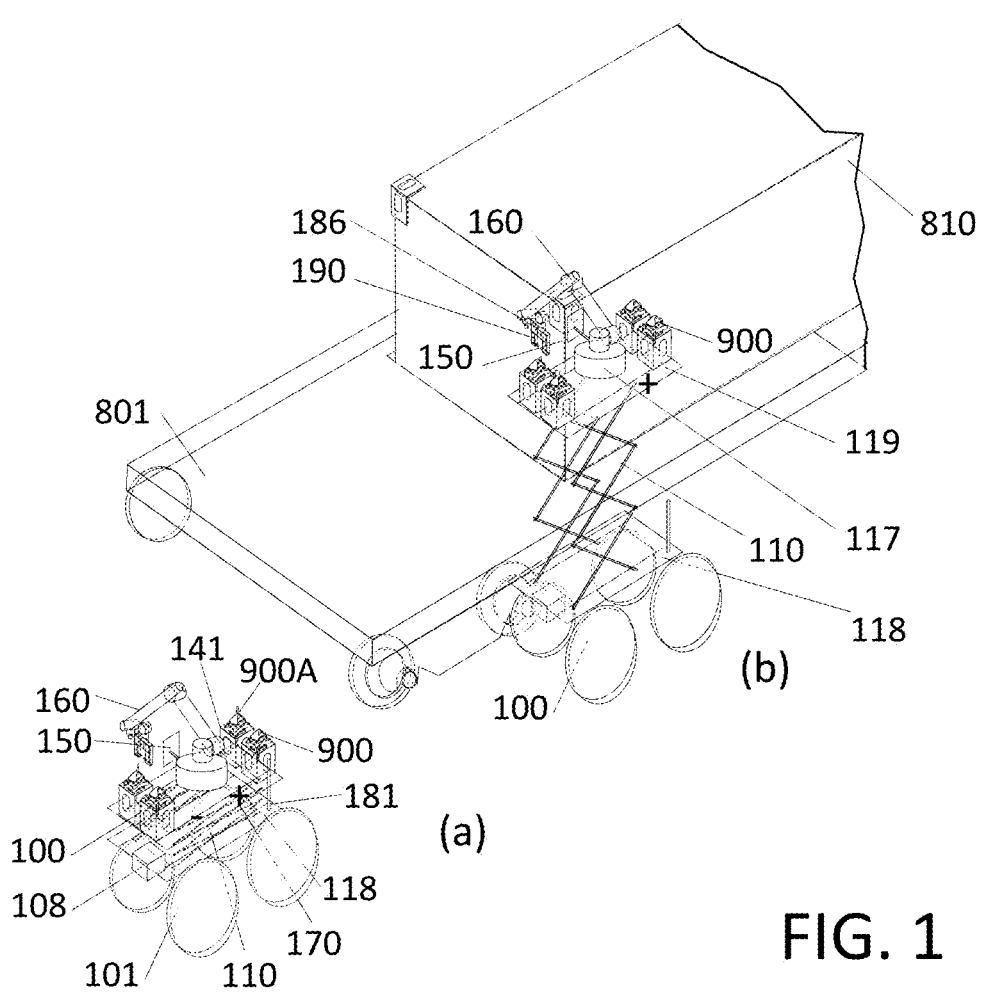
FIG. 1 presents a perspective view of a ground mobile robot manipulator system equipped with an electric gripper assembly for handling railway IBC along one side of a railcar, placing IBC in the top corner casting of the lower container.
Figure 5B:
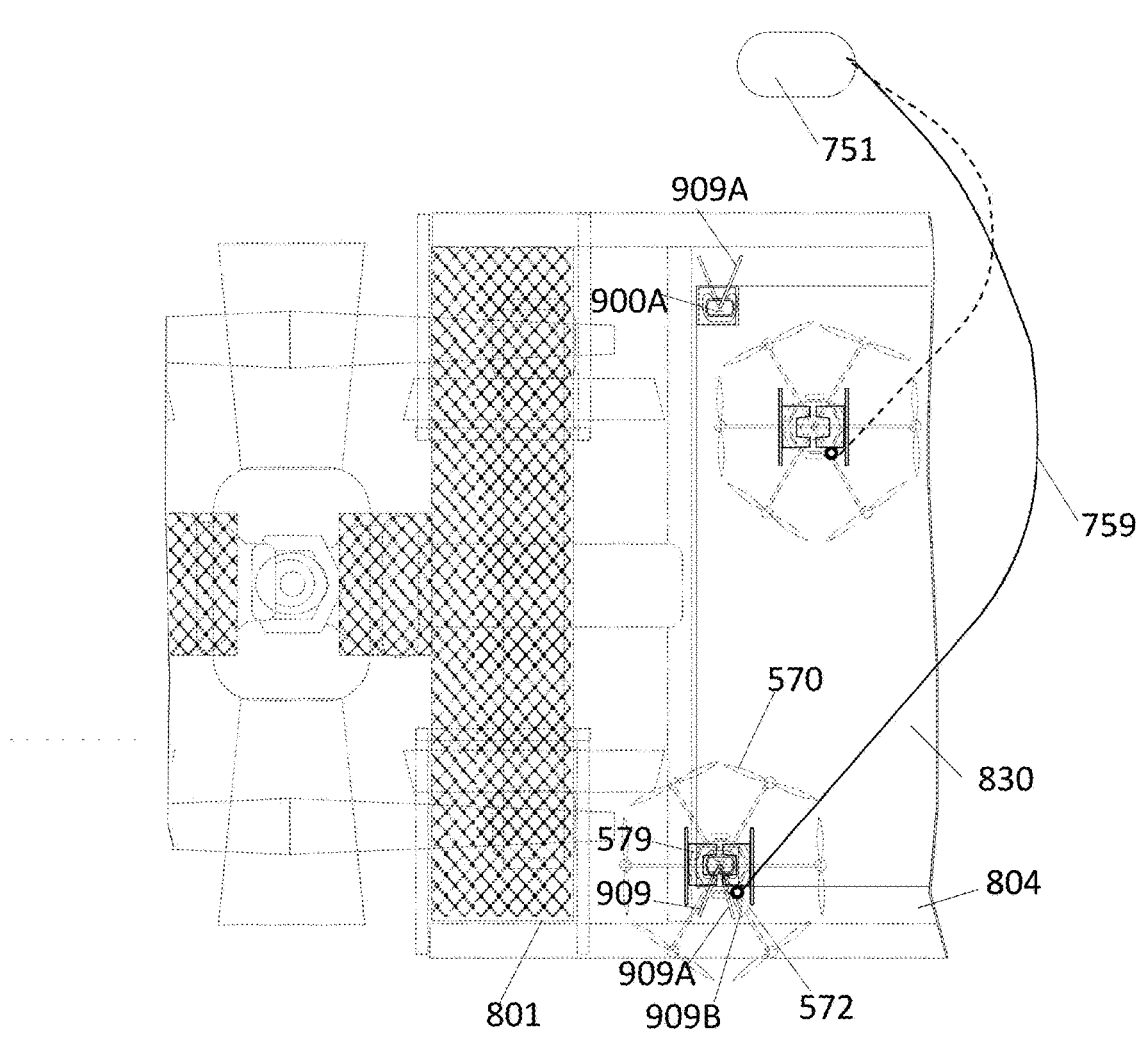

FIG. 5B presents a top view of the tethered drones carrying the pneumatic air hose, lifting and placing the IBC to the top of the bottom container shown in FIG. 1, and demonstrating its capability to shift the handle of the IBC to a required angle in order to disengage the IBC from the bottom container.

Figure 6:
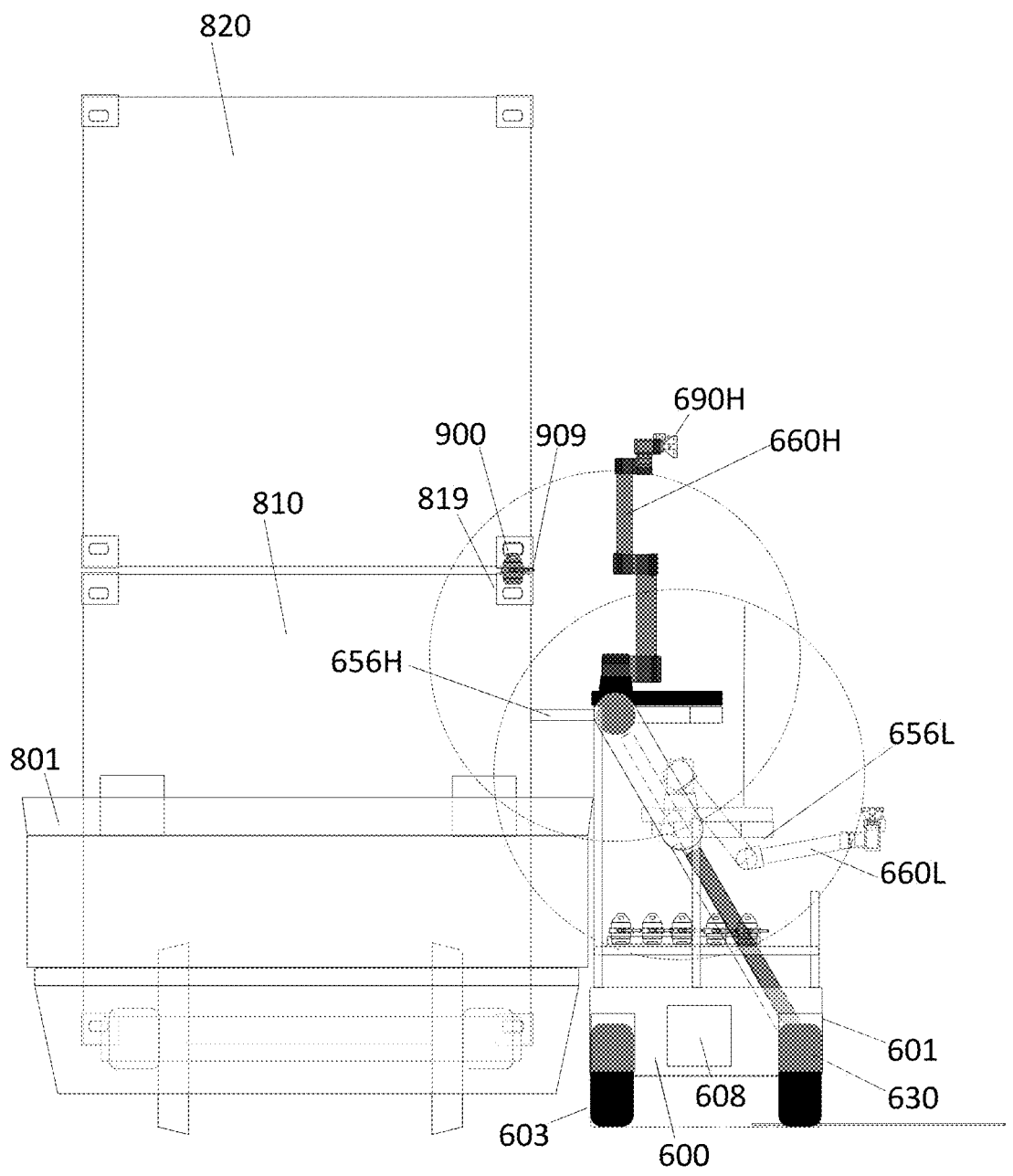

FIG. 6 presents a front view of an alternative ground mobile collaborative robot manipulator shown in FIG. 4 with an alternative arrangement of an extendable magnetic stabilizer. It also demonstrates the manipulator's capability of performing IBC locking and unlocking by the IBC handle.

Figure 6A:
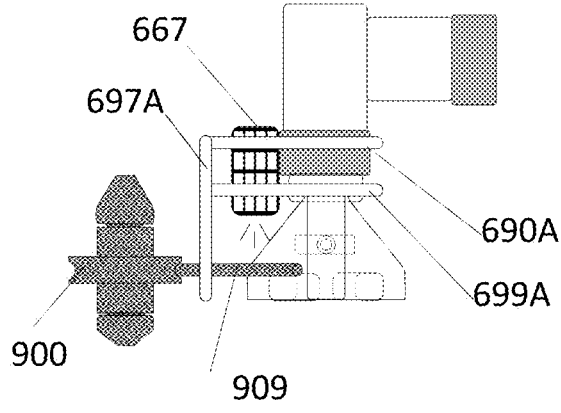

FIG. 6A presents a scheme of using a combined electric gripper, magnetic gripper, and a picking pin tool similar to the one presented in FIG. 4D for IBC locking and unlocking.

Figure 6B:
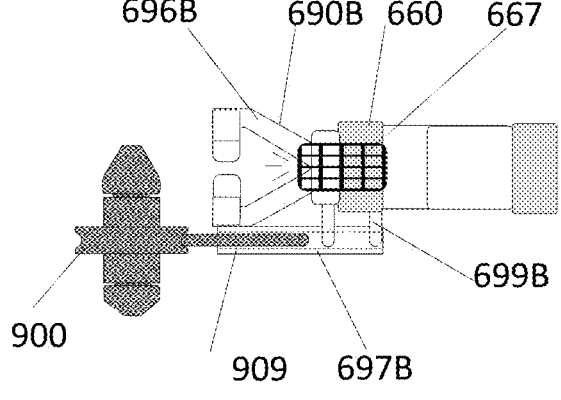

FIG. 6B presents a scheme of using a combined magnetic gripper and a socket sleeve attached to the tool flange of the manipulator for IBC locking and unlocking.

DESCRIPTION OF THE PREFERRED EMBODIMENTS

FIG. 1 depicts structural and functional principles of the ground mobile robot manipulator 100 for handling railway IBC 900/900A, specifically the IBC placement during railcar loading operation:

on the left-hand side, a mobile robot manipulator system is shown at its retracted position, rapidly moving from one railcar to another carrying IBC 900/900A and robot manipulator 160 on top of a lowered scissor lift 110;

on the right-hand side, the same system 100 is shown at its erected position, picking up an IBC from its top platform 119 of the raised scissor lift 110 and placing it into the top corner casting of the lower container.

The ground mobile robot manipulator system 100 is composed of a robot manipulator 160 mounted on a UGV, an abbreviation for an unmanned ground vehicle, with either wheeled or tracked chassis 101 including a driving mechanism and power source 108 such as electric batteries, a remote-controlled or an autonomous navigation system 181 with a processor and a robot vision unit with camera 186, a GPS antenna, an onboard scissor lift 110, and a lateral magnetic stabilizer 150. The system 100 is capable of carrying the required number of spare IBCs for servicing several railcars.

The motion of the mobile base 101 is independent of the robot manipulator 160. The mobile base 101 enables the robot manipulator 160 to approach the target corner casting where the IBC is to be installed and secures the position of the base of the robot manipulator with the aid of the lateral magnetic anchor 150 sticking to the sidewall of the corner casting and/or the shipping container. The robot arm 160 is then employed to pick up the IBC by its gripper 190 and place them into the corner casting.

The IBC holder 141 with a top opening similar in shape to the corner casting of the container is to be made in a lightweight material. The similarly contoured IBC holder is configured to hold IBC in an almost identical pose as they are installed into the corner casting, simplifying the pattern recognition, localization, and the IBC picking-up operation by the robot manipulator and end effector. A quick releasable magnetic mechanism is foreseen to be built into the IBC holder to secure them during the traverse in the rail yard.

The mobile robot manipulator 100 uses Robot Operating System (ROS) as a common framework for integrating software and interacting with the hardware listed above. The manipulator operates by autonomously switching between a set of predefined states: such as waypoint navigation, 2D laser, 3D LIDAR perception or other real-time robot vision-based alignments, IBC picking, IBC placement, IBC locking, and IBC unlocking that are triggered autonomously by sensor inputs and the status of the mission. The mobile robot manipulator is built as a state machine using the SMACH library.

Robot localization and navigation algorithm allow the mobile manipulator 100 to move autonomously and safely in the railway yard and to reach a specific railcar and a corner casting of interest. It comprises two basic components:

a robot localization system that estimates the position and orientation of the mobile robot 101, relative to the railway yard and the particular railcar of interest;

A waypoint path planner that computes feasible paths for the robot to reach a specific railcar, shipping container, and the corner casting.

Optionally a cost map may be built to further optimize the route planning taking the cranes' path/schedule and safety regulation into consideration.

For approaching a specific IBC holder and a specific corner casting of the loaded lower container, a more precise navigation method is employed in terms of a relative localization and navigation system based only on the measurements of the laser scanners to position the robot arm 160 and the end effector 190 precisely close to the IBC holder 141 or the top cavity of the corner casting of interest, enabling the robot arm 160 to reach, grasp and manipulate the IBC 900/900A either rests in the IBC holder or the cavity of the specific corner casting.

In operation, taking the IBC placement as an example, the mobile robot manipulator 100 navigates through a GNSS-based localization system or other guiding systems such as TOS, an abbreviation of container terminal operating system, and approaches the railcar either by obtaining the waypoints from an autonomous controller or instruction from an autopilot, part of remote control.

In the autonomous approach, the mobile robot manipulator obtains the approximate locations of the railcars as well as the locations of the corner castings from a central controller, for example, a terminal operating system (TOS) based on a series of data sources including stored data about the previous operation shared by other wayside equipment such as cranes, straddle carrier, transport AGV, and other mobile robot manipulators, the data about the railway yard obtained from GPS, google map, or sweep scan of UAV;

stored standardized geometries of the shipping containers and corner castings, the active scanner reading of the AEI tags of the railcars entering into the railway yard, and dynamic status data of the container loading and unloading shared by the cranes, etc. The navigation algorithm includes obstacle detection and avoidance based on sensors, for example, a laser scanner.

For the final precise navigation, taking the IBC picking up as an example, once the system 100 is in the vicinity of the targeted corner casting or IBC holder, The laser rangefinder and the robot vision camera 186 are employed to precisely control the movement of the robot manipulator and the end effector by visual servoing. The feedbacks of the force sensors included in the end effector help identify whether the desired contacts are made.

Once the mobile robot aligns its position with the target container, the lift 110 extends to its elevated position, and the lateral magnetic anchor 150 engages with the sidewall of the corner casting and/or sidewall of the container securing its position. Then the system 100 has the end effector 190 approached the top cone 901, flange 902, or the bottom cone 903 of the target IBC stored in the IBC holder, picked up IBC 900 or 900A from the IBC holder 141 at the fixed known position in a preprogrammed fashion, moved its manipulator arms to approach the target corner casting 819 in the container, placed the IBC inside the target corner casting and released its grip by removing the gripping force. The mobile robot manipulator 100 has its anchor 150 disengaged from the container, optionally lowered its scissor lift 110 close the ground to give a lower center of gravity to the system, and then moves towards the next targeted corner casting of interest.

The mobile robot manipulator 100 quickly moves from one railcar to another, locates, approaches, picks, and places between the IBC holders and top cavity of the corner casting, however only on the proximal side of the container near the passage of the mobile robot manipulator, restricted by the arm span of the lightweight robot manipulator.

A weather protective enclosure surrounding the robot arm and end effector is foreseen to help assure the reliable performance of mobile robot manipulator 100 under all weather conditions. Additional temperature and humidity control room with a quick openable cover built at the top portion of the mobile robot manipulator 100 from the lower platform 118 and up, enveloping the retracted scissor lift 110, robot manipulator 160, and the end effector 190, creating a temperature and humidity controlled environment, is also foreseen for the purpose of prolonging service time of the sophisticated equipment under harsh weather conditions. The temperature and humidity control room may provide a heater, a dry air blower, a deicing device, etc.

Figure 1A:
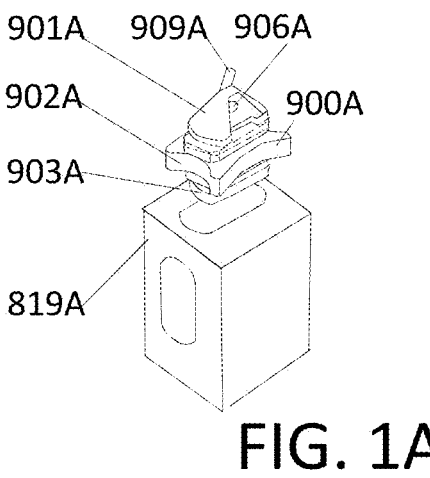
FIG. 1A presents a close-up view of an IBC installed into a corner casting located on the other side of the container opposite to the delivered side, showing details of the members of the IBC.

In FIG. 1A, a typical interbox connector (IBC) 900A is inserted into the top corner casting 819A, supported by a strong frame of the container. It should be noted that the IBC 900 and IBC 900A are identical IBC except their orientations are 180 degrees apart, identifiable by the manual handle 909/909A.

Taking an IBC 900 as an example, the IBC 900, each weighing about 6 kg, works like the twist lock that the crane uses to grasp the container in the marine or rail intermodal terminal. The top cone 901 and bottom cone 903 of the IBC 900 are one-piece of cast steel and are shaped like the letter "I". The top cone 901 is pointed to make it easier to insert into the lower corner casting 828 of the top container 820 and the bottom cone 903 is essentially a flat rectangular cuboid. Some old models of IBC with small protruding ears on the end corners. An aperture 906 is typically created at the top cone 901. A handle 909 projects from the shaft in the middle at 45 degrees to the top cone 901/the bottom cone 903.

The mid flange 902, typically made in two-piece castings, surrounds the center shaft and separates the top cone 901/bottom cone 903 sections so that the two containers are separated by the flange 902 about an inch thick. There is a slot created in the flange 902 for the handle 909 to turn 90 degrees. The two smaller necks projected upward and downward from the mid flange 902 are formed to loosely fit into the oval holes in the top corner casting 819 of the bottom container 810 and in the bottom corner casting 828 of the top container 820, extends to the sides of the opening and hold the containers from sliding sideways, forward or backward.

The top cone 901 and bottom cone 903 have essentially the same projected bottom contour, except for some old models. Therefore, by turning the handle 909 to the full 90 degrees of travel, the two containers are securely locked together or unlocked at the same time.

It should be noted that there exists a notable difference between the top corner casting of the bottom container 810 and the bottom corner casting of the top container 820. The bottom casting has two stadium-shaped holes or apertures on two sides plus a large stacking hole underneath. The top castings have two differently shaped holes on the side and the stacking hole on top. The top castings have a stadium hole on the long side of the container, and a shield hole on the front or rear end of the container. Those uniform patterns and recognizable differences about those apertures are used by the proposed mobile manipulator to position the mobile robot and the manipulator.

Figure 1B:
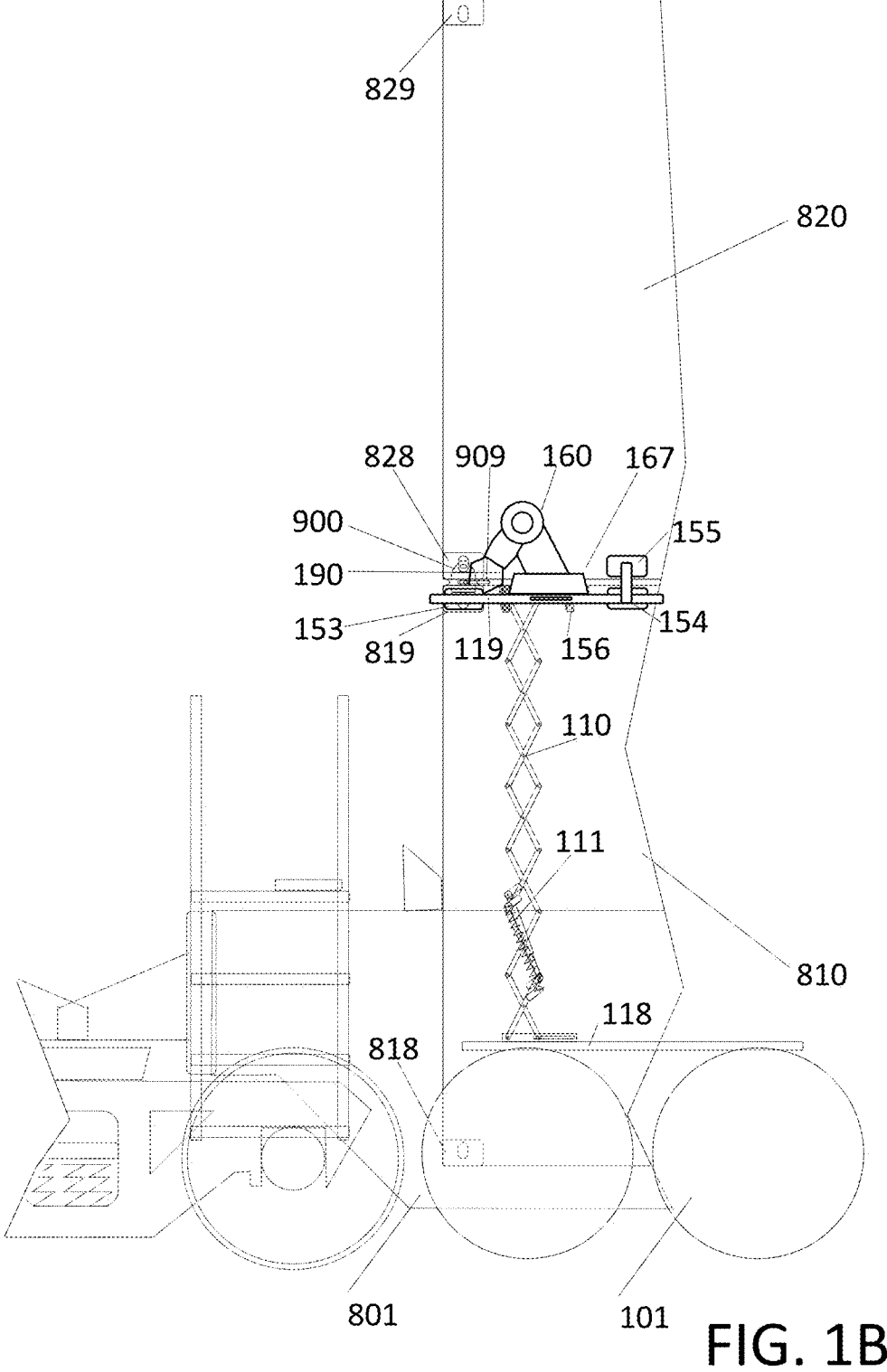
FIG. 1B presents a partial side view of the ground mobile robot manipulator shown in FIG. 1 performing locking or unlocking of the IBC. It also demonstrates the details of the lateral magnetic anchor/stabilizer.

In FIG. 1B. the shipping container 820 is stacked on top of the shipping container 810 interlocked by the two IBC 900 on the proximal side and 900A on the distal side.

As best illustrated in FIG. 1B, the magnetic stabilizer 150 comprises a magnetic positioner 153, two other magnetic supports 154/155, and a series of gap-keeper rollers 156 attached to the top platform 119. The mobile manipulator 100 approaches the top corner casting where the IBC is to be installed and aligns the magnetic positioner 153 with corner casting 819 in reference to either the edge of the side cavity in the corner casting and attach to it by activating the magnetic force. Other magnetic support 154 and 155 sticking to the lower and upper container help further stabilize the position of the top platform 119 as well as the robot manipulator 160, especially important for the IBC locking and unlocking operation.

It is foreseen that an alternate hydraulic stabilizer 117 with a large footprint or with outriggers (not shown in the figure) may be installed and activated to help stabilize the base of the manipulator.

The above-developed system implies a rather general methodology of firstly approaching in the vicinity of a target with a long span, rugged mobile mechanisms including scissor mechanism, secondly making a final precise approaching or positioning by visual servoing in the short-range. The scissor mechanism may contain a plurality of vertical scissor lifts and horizontal scissor arms at different orientations to bring the lightweight robot arm in proximity to the targeted objects.

As illustrated in FIG. 1 and FIG. 1B, the ground mobile robot manipulator 100 includes a scissor mechanism 110 comprising a plurality of linkage bars or struts arranged in a crisscross or scissors-like pattern, linked by arm-pins and shafts. Based on cross-balance supports, the scissor leg 110 achieves vertical movement to deploy the robot arm 160 in the vicinity of the corner casting of interest. The scissor mechanism also includes:

- a top platform 119 and a bottom platform 118 attached to the scissor-leg 110;
- a pneumatic actuator 111 either double-acting type or single-acting type with a return spring that is installed within the scissor leg 110 and drives the vertical movement of the scissor leg 110;
- a plurality of rollers or other equivalent rolling or sliding bearing elements that are mounted to the bottom platform 118 enabling the scissor leg to slide along a track mounted to the chassis 101;
- a spring box that is mounted to chassis 101 and keeps pressure against the scissor leg 110 towards the sidewall of the container. Other alternative coil springs, leaf spring, rubber airbags, or other arrangements for the same function are foreseen;
- a series of gap keeper 156 in the form of ball transfer or rollers that are mounted to the top platform 119 interposed between the IBC manipulator 100 and the sidewall of the container 810, helps maintain a consistent gap between the head 190 and sidewall of the container 810, assisted by the spring box. It is foreseen that magnets can be deployed to help to achieve the same automatic self-positioning;

A linear actuator may also be mounted to the chassis 101 to achieve planar movement of the whole scissor mechanism to fine-tune the position of the raised top platform in an orientation other than only in the vertical direction. The employment of mecanum wheels or other suitable types of Omni wheels to the chassis may also help achieve multi-directional movement of the mobile robot.

The linear actuator 111 may be an air cylinder powered by a portal source of compressed air or gas, or another actuator driven by electric, hydraulic means.

The operation of IBC locking or unlocking by mobile robot manipulator 100 involves rail yard navigation, approaching railcar and corner casting of the loaded container of interest, magnetic anchoring or stabilizing against the strong frame or the corner casting of the container, picking/grasping the manual handle 909/909A in a similar way as the placement/removal of the IBC, except the last step. Instead of vertically dropping or raising the grasped IBC body, the manipulator 100 holds the handle 909/909A and performs a linear or angular movement by the robot arm 160 to achieve locking and unlocking of the IBC of interest.

An alternate arrangement is foreseen where the lateral magnetic positioner 153 becomes part of the end effector 190 and an additional toggle driven by a double-acting linear actuator engaging with the handle 909/909A to lock/unlock the IBC. In this case, the precise lining between the corner casting and the magnetic positioner 153 can be achieved by robot arm 160

The locking and unlocking may be also achieved by using other types of semi-automatic or automatic type IBC instead of manual IBC 900/900A.

Figure 2:
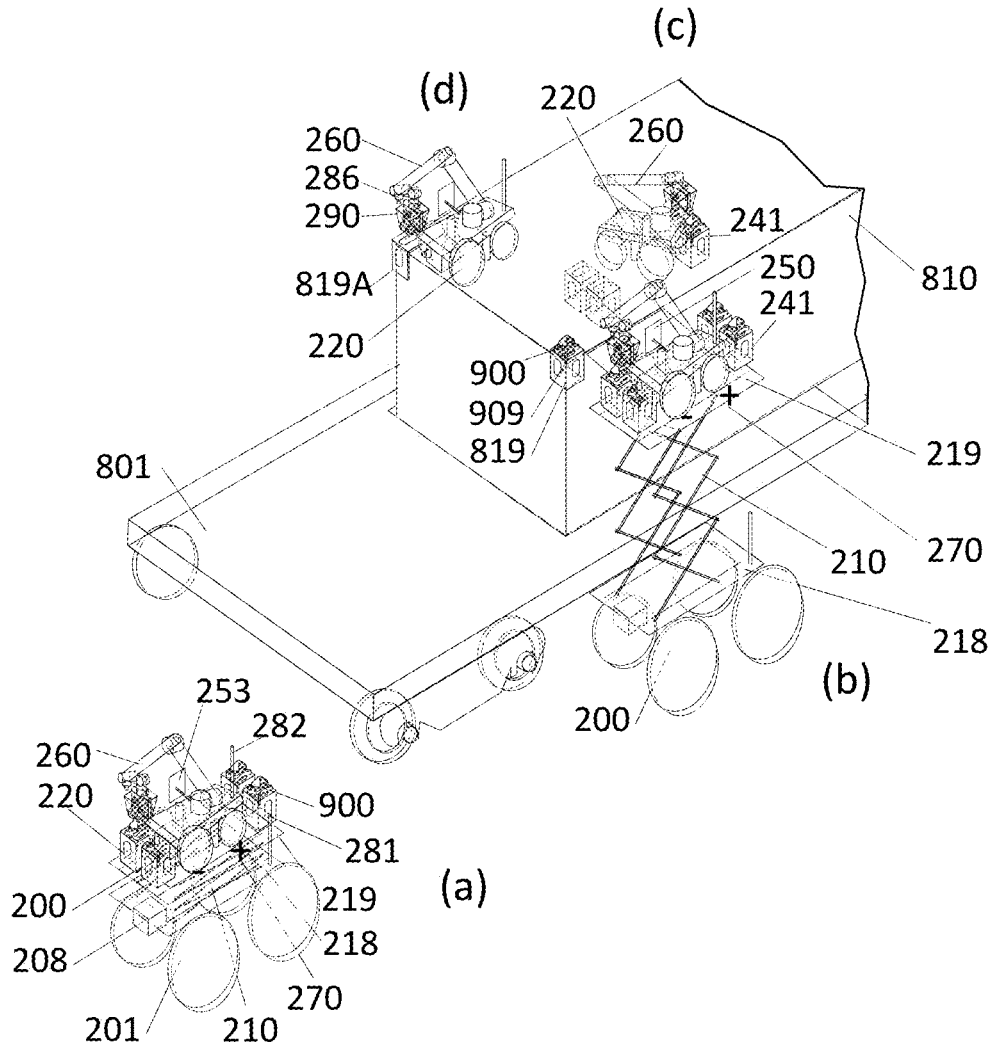
FIG. 2 presents a perspective view of an alternate mother robot manipulator carrier system for handling railway IBC where a heavy ground mother carrier carries a lightweight autonomous mobile robot, referred to herein afterward as AMR, and several IBCs required for a single container.
Figure 2A:
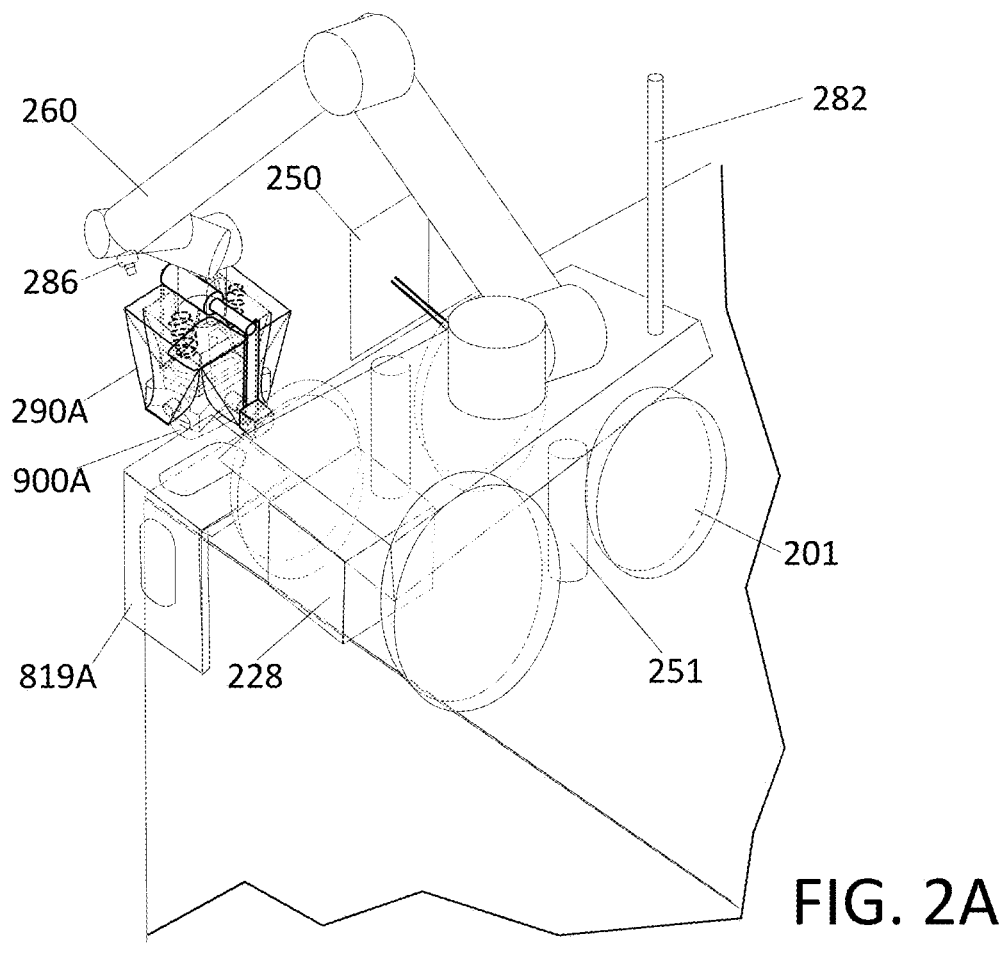
FIG. 2A presents a close-up view of the autonomous mobile robot shown in FIG. 2.

FIG. 2 and FIG. 2A depict structural and functional principles of an alternate mobile robot manipulator mother carrier system 200 for handling railway IBC.

On the lower left-hand side of FIG. 2, an unmanned ground carrier 201 is shown at its retracted position, rapidly transporting an AMR 220 and a set of IBCs 900/900A from one railcar to another.

On the lower right-hand side, the same unmanned ground carrier 201 is shown at its erected position, raising its top platform to the roof level of the lower shipping container 810 allowing the carried AMR 220 to land on the roof of the container 810.

On the upper left-hand side, the AMR 220 is shown having navigated to the dismal side of the container roof opposite to the delivered side ready to install an IBC 900A into the corner casting 819A.

On the upper right-hand side, the same AMR 220 is shown having completed the previous IBC installation and returned to the landing site on the proximal side of the container to pick up another IBC from the IBC holder.

The robot manipulator carrier system 200 is capable of not only placing and removing IBC into or from the corner casting, the same function as mobile robot manipulator 100, but also it is capable of performing the same task on both distal and proximal sides of the shipping container. The robot manipulator carrier system 200 differentiates from the mobile robot manipulator in the structure that it split the structure and functions of the mobile robot manipulator 100 into two elements. The ground rail yard navigation and railcar approaching functions are fulfilled by a ground carrier 201 and the final precise navigation and manipulation near the corner casting/IBC holder reaching are fulfilled by an AMR 220.

The ground carrier system 200 comprises a series of components similar to the ground mobile robot manipulator 100. The chassis 201, the driving and power source 208, the navigation system or autopilot/GPS antenna 281, an onboard scissor lift 210, and a lateral magnetic stabilizer 250 are almost identical to 101, 108, 181, 110, and 150. Instead of mounting the similar robot arm to the top platform 119 as in the case of the manipulator 100, an AMR 220 is provided and carried on the top platform 219. An electric battery charger 270, either with a wireless or wired connection is provided in carrier 201 to automatically charge the AMR 220 once it is parked on the top platform 219.

The AMR 220 has a lightweight mobile case capable of carrying a robot arm 260 and end effector 290, an additional autopilot 282, as well as several required IBC per container.

The laser scanner-based navigation system 286 similar to 186 remains at the end of the robot arm 260 near the end effector 290. Additional magnetic stabilizers 251 are provided at the bottom of the AMR capable of securing the AMR 220 against the container roof made of steel once activated.

In operation, the ground carrier 201 brings the AMR 220 in and out of each container roof, while the AMR 220 travels within the container roof to perform placement or removal of all IBCs on the same roof between the IBC holders and the corner castings. Each time when the AMR approaches the corner casting of interest, the magnetic stabilizers 251 are activated to secure the position and pose of the AMR 220 before further precise movement begins such as pick and place of the IBC from or into the IBC holder or the corner casting.

It is foreseen that each ground carrier 201 can take charge of the logistic of several AMR 220 at the same time. The ground carrier system 200 provides operational simplicity and flexibility. It occupies less time on the busy passageway which is normally crowded with the ground trucks, cranes, operators along the railway tracks.

It should be noted that the ground mobile robot manipulator 100 and the robot manipulator carrier system 200 include similar categories of components: controller, sensors, actuators, and power system.

The sensors used can be any suitable type including but not limited to dead reckoning, tactile and proximity sensing, triangulation ranging, collision avoidance, position location. It may be light sensors, sound sensors, temperature sensors, contact sensors, proximity sensor (infrared IR, ultrasonic, photoresistor), distance sensor (ultrasonic, infrared, laser range, encoder, stereo camera), pressure sensor, tilt sensors, navigation, and positioning sensors such as GPS, digital magnetic compass, localization) acceleration sensors or accelerometers (static force and dynamic force), gyroscope, inertial measurement units.

The actuators could be any suitable type of electric, pneumatic, hydraulic motors that move the robot.

The mobile base can be wheeled, tracked, or legged.

The power source can be any suitable type including but not limited to DC battery, AC source, air compressor, combustion engine, etc.

Figure 2B:
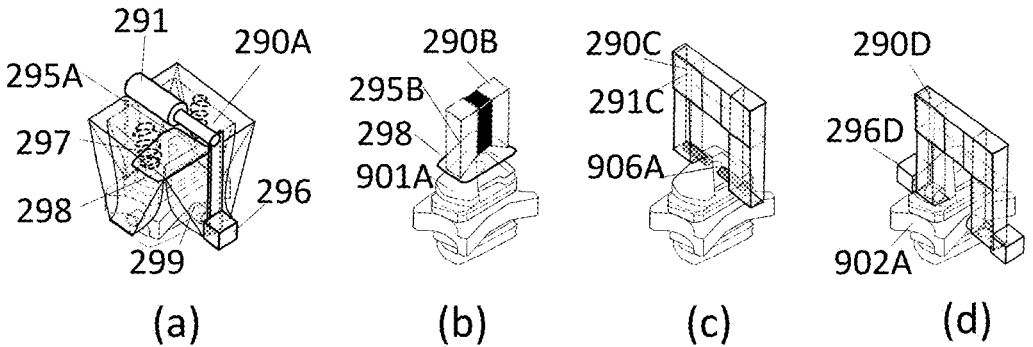
FIG. 2B presents four alternate gripper assembly designs: (a) a combined electric gripper acting on the IBC flange and magnetic gripper by the top of the IBC, (b) a tapered magnetic gripper by the top of the IBC, (c) an electric or pneumatic gripper by the cone aperture of the IBC and (d) an electric gripper with magnets built into the fingers and in connection with a vibrator.

FIG. 2B provides four alternate end effector designs to grasp and manipulate IBC.

Since the IBC is made of ferromagnetic material such as cast or forged steel parts, it is advantageous to apply magnetic force to selectively pick up and release them through controlled electromagnets 295A in case (a), pneumatic or electric controlled permanent magnets 295B in the case of (b). Magnets may also be incorporated into the fingers 299 of the contact-force type of grippers as in case (a), (c), and (d).

Certain IBC installed in the railcar may be jammed within the cavity of the corner casting. A compact vibrator 294A and 294D driven by pneumatic, electric, or hydraulic means are foreseen to loosen the IBC before extracting the IBC as shown in case (d). The electric gripper based on contact-force can be based on a two-fingered linear motion actuator as 291A and 291C or other suitable types of means, for example, multiple jaw grippers, vacuum grippers, pneumatic grippers, hydraulic grippers, or servo-electric gripers. Spring 297 may be added to assure maximum contact.

For the magnetic gripper, the robotic manipulator operates to have the magnetic gripper approach the center point of the IBC with force feedback to identify when the IBC is reached. An engagement cone 298 or other conformal-shaped fingers following the contours of other parts of the IBC are foreseen to make sure the desired contacts are made.

As the aperture, 906/906A in the top 901/901A of the conventional IBC is always at a predictable position and orientation when it is inserted into the corner casting of the bottom container, the apertures may also serve as a grasping point by the robot.

The IBC holders 141 and 241 may be arranged as crates with fixed positions to facilitate the pre-programmed pick-up and dropping off.

Tethered AMR 200 is also foreseen to prevent accidental fall of the AMR 200 from the container roof or continuous power supply.

Figure 3:
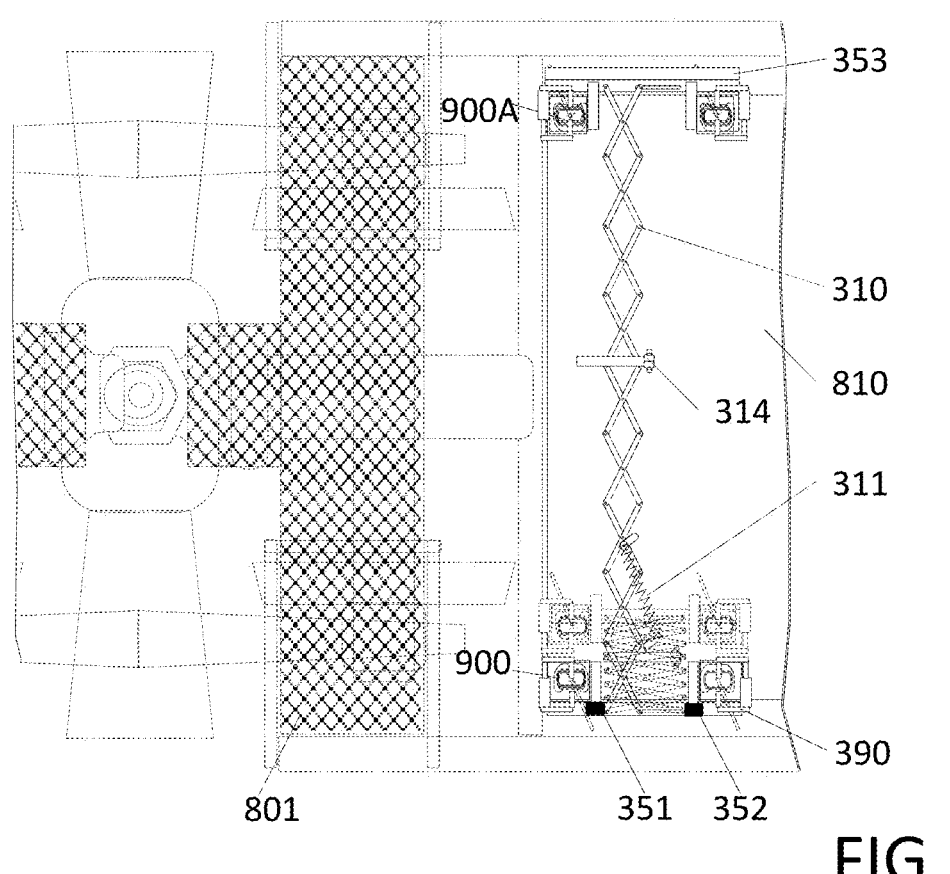
FIG. 3. presents a top view of an alternate foldable IBC handler capable of expanding its arm to deliver IBCs on proximal and distal, both sides of the container roof.
Figures 3A, 3B:
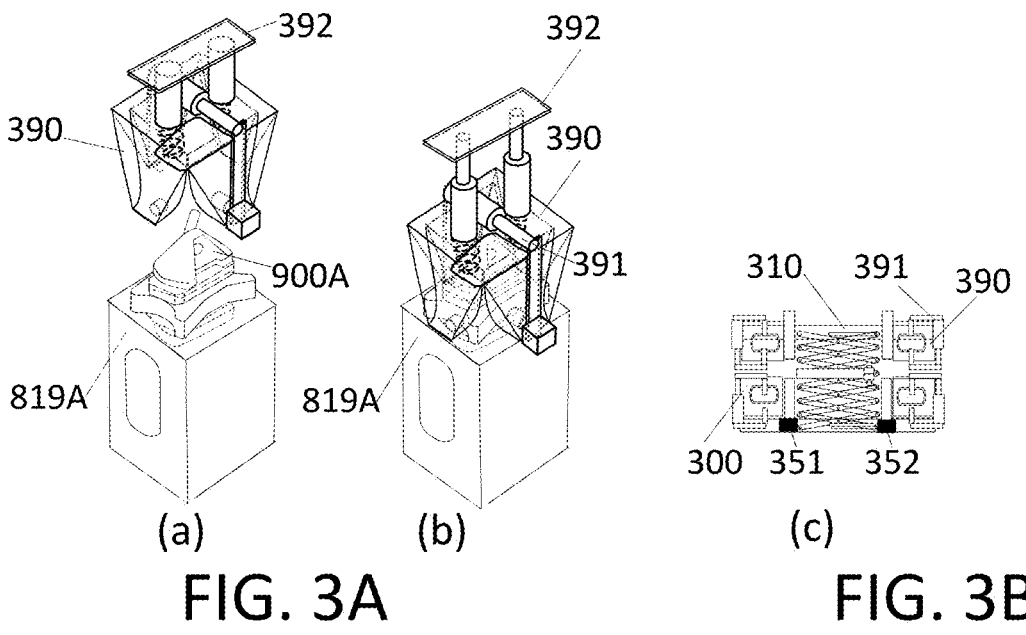
FIG. 3A illustrates the structural and functional principle of the gripper shown in FIG. 3.
FIG. 3B presents a top view of the foldable IBC handler shown in FIG. 3 at its retracted position.

FIG. 3, FIG. 3A and FIG. 3B depict a foldable IBC handler 300, an alternative to the AMR 220. Instead of an AMR 220, the foldable IBC handler 300 with preloaded four IBC is brought to the container roof to place or remove all the IBCs on both sides of the container. Other monitoring vision devices including camera 314 are mounted to help remote control.

In operation, once the foldable IBC handler 300 is brought to the container roof, it firstly activates magnets 351 and 352 to stick against the edge of the container on the delivered side, and secondly, it activates the scissor arm 310 driven by the actuator 311 to expand the frame to the opposite side of the container. A plurality of rollers are mounted to the bottom of the handler 300, including a plurality of fixed orientation wheels mounted to the fixed edge 318 aligned with the edge of the container and castor wheels mounted to the extended edge 319. Thirdly, once the deployment of the scissor arm is completed, a gap keeper 353 drops to keep the handler 300 aligned with the other edge of the container. After the above steps are completed, the handler 300 is capable of guiding itself along the edges of the container to roll left and right to reach corner castings on the container roof with a similar end effector 390 moving up and down driven by an actuator 392.

FIG. 4, depicts an electric mobile collaborative robot manipulator system 400 for handling IBC that is composed of the following members:

a ground mobile robot 401 with wheeled or tracked chassis, a power source such as electric batteries, a navigation system capable of autonomous control or self-driving aided by a first robot vision unit, and other sensors onboard the mobile robot. The robot vision unit includes at least one camera, and a processor configured to acquire environmental information corresponding to the rail yard, the railcar, and the shipping container and perform visual servoing to approach the mobile robot 401 to the target corner casting of the target shipping container;

a unit load of several IBCs 900 placed in an IBC holder 441 configured to hold the IBCs in their vertical working orientation and transport several IBCs as a group. Permanent magnets are envisioned to be installed at the bottom of each cavity of the IBC holder. Those permanent magnets generate a holding force that restricts the free movement of the IBCs within the IBC holder during the traverse of the mobile robot. The strength of the holding force is significantly lower than the grasping force generated by the magnetic or electric gripper;

a telescoping lift, armed with a force sensor, actuated by an electric linear actuator 411 that is mounted to an inclined frame 412 tilting towards the lateral working side of the mobile robot 401. The distal rod end of the lift has a pair of rollers 410 rolling on inclined tracks 413. A linear guide capable of anti-rotation control and absorption of lateral forces may be used at the distal rod end as an alternative arrangement;

an articulated collaborative robot manipulator 460 whose base 468 is mounted to the distal end of the actuator rod. The six-degree-of-freedom cobot manipulator 460 includes a robot vision unit 467 attached to the wrist of the manipulator or as part of the end effector 490;

an aerial anchor 450 comprising head 451 containing an electric controlled permanent magnet and a body in connection with the base 468 of the manipulator 460, the head 451 is configured to engage with the frame or the corner casting 819 of the container 810 so that it secure and stabilize the position of the manipulator base against the heavy container with large inertia.

A lockable clevis joint or a lockable spherical joint is foreseen to be included between the head magnet 451 and the body of the aerial anchor to allow initial pose adjustment of the head relative to the surface of the frame or corner casting, and then locking the head into the adjusted pose after the initial engagement of the head and the container is accomplished. The electrically controlled or operated permanent magnet can be arranged to lock the head 451 into a self-adjusted position against the container and the body of the aerial anchor at the same time. Such a self-adjustment mechanism allows maximized engagement between the surface of the head magnet and the surface of the frame of the container under variable poses taken by the mobile robot under different ground conditions.

wheel brake 430 that apply brakes to the wheel 403 of the mobile robot with additional outriggers;

a manipulator docking station 470, including the shock mount, air springs, or vibration isolator 471 is provided to support the manipulator 460 and end effector when they rest in the docking station. Other vibration isolators made in vibration damping polymer or polymer composite, for example, visco-elastic polyurethane, are foreseen to be deployed at multiple points within the docking station to restrict passive movements or shiftings of the arm member, wrist member, the end effector relative to the base of the manipulator at multiple directions, isolate vibration and absorb shock impact during travels on rough terrain between target IBC locations. An enclosure or case 472 with the covered opening is mounted on top of the cylinder body of the lift 411 in between the pair of tracks 413 to protect the manipulator from any damages and to provide a friendly shelter against outdoor harsh climate conditions. An accelerometer is foreseen to be deployed in the system to detect the vibration and the shock;

two workspaces 466L and 466H, two groups of points reachable by the end effector when the lift is retracted or extended. In the lower workspace 466L, the collaborative robot manipulator 460 can move the end effector to pick up or deposit IBC from/to the IBC holder 441 resting at the lower deck of the mobile robot. In the higher workspace 466H, the manipulator 460 can move the end effector to place or remove the IBC to/from the top corner casting 819;

a second robot vision unit including a camera 467 either being attached to the wrist of the manipulator 460 or being part of the end effector 490, enables acquisition of environmental information corresponding to the railcar, the shipping container, the IBC holder as well as other objects or devices onboard the mobile robot, visual inspection, and visual servoing, a technique that uses feedback information extracted from the robot vision unit to control the motion of the aerial lift, aerial anchor, robot manipulator, and the end effector.

An additional climate control system including thermal sensors deployed inside the sensitive equipment, a heating unit installed inside the docking station, an enclosure with a thermal insulation layer configured to reduce the heat transfer across the enclosure, a heat loss controlling mechanism either in the form of a closable and adjustable opening in the enclosure, or an adjustable ventilation fan deployed at the opening, configured to adjust the heat transfer between the interior and exterior of the docking station, and a control processor configured to provide an active temperature and humidity control of the encased sensitive equipment such as robot manipulator, end effector, robot vision unit, as well as their controllers, for a prolonging service time under harsh weather conditions. Such a climate control system is foreseen to automatically maintain the temperatures of the sensitive equipment within a predetermined range, for example above zero and below 40 degrees Celsius.

Passive heat transfer devices such as multiple heat pipes may be integrated into the above-mentioned climate control system. For example, a heat pipe employing phase transition for efficient heat transfer may be attached to the heat sinks mounted to the electric battery of the mobile robot at one end and connected to the heat spreaders mounted to the interior of the docking station at the other end, help accelerate the dissipation of the heat generated from the electric battery, especially in hot weather, and help keep the encased sensitive equipment warm in cold weather.

The manipulator and the end effector may rest in a fetus pose or other suitable pose within the docking station. The cover to the opening in the enclosure of the docking station may be built directly on the exterior of the manipulator and/or end effector so that once the manipulator and the end effector takes the rest pose within the docking station, the cover built on their exterior automatically seal the opening in the enclosure. A change in the rest pose of the manipulator or the end effector can change the degree of the opening in the enclosure, therefore the extent of the heat transfer between the interior and exterior of the docking station.

Other active vibration control approaches relying on a closed-loop system with feedback can also be integrated into the manipulator docking station.

It should be noted that the robot with a variable height stand powered by a lift is quite common. However, a telescoping lift with an aerial anchor mounted to the collaborative robot stand deployable in the target workspace is unique, not to mention the magnetic anchor deployable directly by the telescoping lift itself.

In FIG. 4, 410H/410L, 451H/451L, 490H/490L indicate the same member but at high and low, two different positions respectively.

The above setup enables a lightweight, relatively flimsy mobile collaborative robot manipulator to achieve reliability in terms of pose repetitiveness in the target workspace. The robot vision unit 467 integrated into the end effector helps refresh/recalibrate promptly the reference required for operating precisely the manipulator 460.

FIG. 4A, FIG. 4B, FIG. 4C, FIG. 4D provide an additional detailed illustration of the alternative arrangements similar to FIG. 2B.

In FIG. 4A, a single-sided electric gripper 490A capable of automatic positioning or self-aligning against the IBC flange 902 and grasping the IBC by the cone aperture 906 is provided. The gripper 490A includes a connection frame 499A that integrates an electric linear actuator 491A and a strike plate 498A into one body. The bottom of the actuator 491A and the bottom of the strike plate has controlled contour and serve as the automatic positioning reference once rest against the IBC flange 902. A force sensor (not shown) integrated at the tool flange 469 helps confirm the engagement between the end effector and the IBC flange. By moving the rod 492A through aperture 906, it grasps or releases the IBC in the target location, guided by the robot vision unit 467 mounted to the tool flange 469.

In FIG. 4B. a magnetic gripper 490B engageable with the ferromagnetic IBC flange 902 is provided. Since the IBC flange has a top flat surface that supports and engages with top container 820 frequently, being fabricated in a relatively more precise manner and kept relatively more smooth and less rusty than the rest of the IBC members, it becomes an ideal location for the engagement with the magnets 495B/496B of the magnetic gripper.

The functioning principle of the magnetic gripper relies on the application of the combined AlNiCo and neodymium magnets. The magnetic flux of the AlNiCo magnets passes the neodymium magnet in a deactivated state and closes the magnetic circuit over the gripper base body made of steel. To activate the system, an electric current pulse is conducted through the coil, which reverses the polarity of the AlNiCo magnets accordingly. The magnetic flux can not pass the neodymium magnets anymore and has to pass via the IBC flange into the opposite pole, creating a holding force.

When the magnetic gripper switches on, the manipulator tilts slightly and rolls around the engaged gripper and IBC to make sure that solid magnetized contact is achieved at an aligned engagement orientation.

In FIG. 4C (a) and (b), two views of the same combined gripper 490C integrating magnetic gripper 495C/496C and a redundant double-sided electric gripper 491C/493C is provided. The electric gripper serves as a backup to the efficient magnetic gripper.

As one of the potential drawbacks of magnetic grippers 495C/496C is that workpiece can dislodge due to surface roughness or oil stains on the surface, causing the workpiece to slip out of the gripper's grasp, the additional mechanical dual grippers 491C/493C with tapered pins and optionally elastomer friction enhancer, pushing against or through the aperture 906 adds an assurance that the IBC is securely held by the gripper 490C. It should be noted that the grip can be achieved by the pins passing through aperture 906 or by the friction between the tapered pins and the cone if the pins do not go through.

The number of travel of the rod 492C/494C made can be used as a control to gauge the successful grip of the IBC by the servo-electric gripper 491C/493C.

In FIG. 4D, the magnetic and the backup redundant electric gripper is further combined with an additional picking tool 497D attached to the tool flange with the aid of the anchor assembly 499D. Under the guidance of the robot vision unit 467, the manipulator 460, at a reduced speed, can pick up or manipulate the IBC by inserting the pointed pin through the cone aperture 906. This provides a secondary backup tool for picking up the IBC at outdoor working sites.

In FIG. 4E (a) and (b), a wedge actuated magnetic dual gripper 490E is provided. The gripper 490E is composed of three main members, a wedge pusher 499E, a left follower magnet 495E, and a right follower magnet 496E that are connected through two sets of pin/compressing spring assemblies 493E. The left and right follower magnet, each has an extended top frame that ends at the top beam 497E and 498E passing through two cavities 494E created in the pusher body. The wedge action takes place at shared interfaces 491E and 492E.

In operation, the magnets 495E and 496E of the gripper 490E rest loosely on top of the IBC flange 902 as shown in FIG. 4E (b) firstly. As the manipulator further pushes down against the flange 902 as shown in FIG. 4E (a), the top edges of the cavities 494E push the top surface of the top beam 497E and 498E, forcing the two magnets 495E and 496E to compress around the IBC and maximize the contact area between the magnets and the IBC flange 902, overcoming the spring actions of 493E. The electronic signal activates the magnets grasping the IBC by the flange.

In overall system operation, taking IBC placement as an example, upon communication with the terminal operating system (TOS), AEI tag feedback, as well as the stored GPS data shared during the previous crane loading or IBC handling process, the mobile ground cobot manipulator system 400 arrives at one end of the railcar that carries the first layer of the target container 810. Through visual servoing, the mobile robot stops the mobile robot at a position where the aerial anchor 450 is engageable with the solid container frame under the corner casting.

After deployment of the brakes 430 to the wheel 403 which serve as the ground stabilizers, the manipulator wakes up from its docking station 470 and picks up an IBC from the IBC holder 441 rest at the lower deck 418 with one of the end effectors shown in FIG. 4A, 4B, 4C 4D or 4E.

As a safe transit option, the manipulator may immediately flip over the IBC holding orientation with its wrist movement, so that the IBC rests substantially on top of the gripper, making sure that there is no chance of IBC slipping out of the grasp of the gripper.

Then the lift 411 raises the robot manipulator with high speed above 250 mm/s from the level of 460L to the level of 460H when the pair of support rollers 410 roll up to the position 410H from the 410L along the track, moving the workspace of the manipulator from the envelope 466L to the envelope 466H. The head magnet 451 of the anchor 450 mounted to the distal end of the lift 411 engages with the frame of container 810, adjusted by the spherical joint.

After receiving positive feedback from the force sensor mounted to the lift 411 which confirms the solid engagement between the anchor and the frame of the container, the central controller 408 sends a signal to activate the switchable magnet 451 to grasp the frame of the container, secure and stabilize the position of the base of the manipulator. It should be noted that the anchor 450 may include several head magnets instead of only a single one.

The manipulator moves the IBC 900 over the top of the corner casting 819, and flipping-over again so that the IBC 900 returns to its regular position where it sits below the gripper 490, and with the aid of the robot vision unit 467 which recognizes the position of the apertures in the corner casting, it adjusts its orientation and places the IBC inside the corner casting 819.

The force sensor install at the tool flange 469 helps confirm the appropriate seating of the IBC to be installed relative to the corner casting. The central controller 408 then sends another signal to switch off or demagnetize the anchor 450 enabling easy disengagement of the stabilizer from the container. The lift 411 retracts to its stowed position and the manipulator 460 returns to the docking station taking one of the possible rest poses. The cover mounted to the exterior of the manipulator or the end effector either seals the opening in the enclosure or adjusts the degree of the opening to allow the heat loss following the instruction by the processor. The wheel brake 430 releases and the mobile collaborative manipulator system 400 traverses to the next target container end swiftly with a low overall center of gravity.

As demonstrated, a significant vertical and lateral adjustment of the manipulator position is accomplished with the inclined lift which acts as a robot transport unit or robot positioning track, helping extend the reach both horizontally and vertically and add additional axis capabilities. The inclined track can be configured to have an adjustable and controllable angle relative to the deck of the mobile robot, therefore adding more flexibility to the system 400.

The deployment of the anchor 450, also served as a stabilizer, assures the proper performance of the robot manipulator in the raised workspace high above the ground, despite an overall lightweight setup and in an outdoor environment to see a possible strong wind. The lower workspace of the manipulator allows a large number of IBCs to store at the lower deck position, while still maintaining a low center of gravity of the moving system 400.

The IBC removal operation follows similar process steps with minor adjustments and sequence changes.

It is foreseen that the above system and method can be used as a general design of a lightweight mobile manipulator for automation of manual operation at a significant height above the ground and in a confined space that allows the use of only narrow mobile carriage in an outdoor environment. It avoids the employment of a conventional approach using a fixed heavyweight raised-deck mobile base equipped with a traditional heavy industrial robot manipulator and heavy mechanized lift that results in a low static stability factor (SSF). The SSF is a predictor of vehicle rollover propensity, known as the vehicle's track width (t) divided by twice the height (h) of the mass center above the ground (t/2h), while the vehicle is empty and at rest. Regular SUV design requires a minimum value of SSF over 1.0. If the SSF of a narrow and lightweight mobile manipulator is required to handle a workpiece at a certain height above the ground, then a special technical solution such as the proposed aerial anchor 450 is truly necessary.

A weather protective enclosure, optionally with thermal insulation layer, surrounding the robot arm, end effector, and robot vision unit is foreseen to help assure the reliable performance of mobile robot manipulator 400 under all weather conditions.

FIG. 6. FIG. 6A and FIG. 6B provide further illustrations of the IBC locking and unlocking by the mobile collaborative robot manipulator system 600 that is constructed and functions in a very similar manner as the mobile manipulator system 400 except, instead of a fixed-sized anchor 450, an extendable anchor or stabilizer 656 equipped with a switchable permanent magnetic at its distal end is in connection with the base of the manipulator 660. The deployment of anchor 656 requires an additional electric, hydraulic or pneumatic linear actuator.

Another alternative arrangement of the anchor is foreseen that anchor may be mounted to other members of the robot manipulator having a lower degree of freedom (DOF) than the tool flange, for example, the large arm members of the manipulator, allowing the members of the high DOF, for example, the compact wrist members, to achieve high pose repetitiveness under difficult outdoor condition, for example, in strong wind.

In FIG. 6A, the end effector 690A, identical to the one shown in FIG. 4D is manipulating the IBC handle 909 by the programmed rotation movement, guided by the robot vision unit 667. rotating or twisting the IBC to perform IBC locking and unlocking. Two-prong head instead of single-pole, and the additional friction enhancement coating or sleeves may be provided along the pole or prong to facilitate the engagement and toggle action. It should be noted that such a proposed scheme requires no dedicated gripper for locking and unlocking.

In FIG. 6B, a socket sleeve 697B is attached to the exterior of a magnetic gripper identical to the one shown in FIG. 4B, and to the tool flange of the manipulator 660, with the aid of the anchor frame 699B. The socket sleeve 697B can fit over the IBC handle 909 under the guidance of the robot vision unit 667, even for the short handle version of the IBC whose handle may be concealed within the gap between the upper 820 and lower 810 containers to perform the locking and unlocking of the IBC with the aid of the manipulator.

The above-developed technologies may be applied to train, rail yard, ground truck intermodal yard, or marine container port operation. For example, routine railcar or train brake tests require handling of brake valve by level or handle.

FIG. 5, FIG. 5A and FIG. 5B depict a wayside IBC mobile workstation 700 for the placement, removal, locking, and unlocking of the IBC 900 by UAVs and robot arms carried by the mobile workstation 700, another embodiment of the present invention.

The wayside IBC mobile workstation 700 comprises the following key members:

a mobile chassis 701, having its steering and driving mechanism, similar to the one in a straddle carrier or a rubber-tired gantry crane that can run along the wayside of the railway track;

an enclosure 702 including a roof, sidewalls, front and rear end walls that envelope a section of the intermodal railcar 801 and containers carried by the railcar. The end walls and sidewalls of the enclosure are adjustable according to the dimensions of the railcar and container loading conditions;

a driver cabinet and a control room 707 for the vehicle driver and/or the UAV pilots, where a ground computer, communication network, traffic logistics management, an interface for human control of UAV and robots are provided;

a robot arm 713 that is capable of automatically identifying positions of the IBC 909 by sensors/camera, and performing the placement, removal, locking, and unlocking of the IBCs by gripper;

an alternative to the robot arm including one or a plurality of the foldable IBC manipulator 711 and 712 capable of reaching the IBC handle by a scissor lift and performing locking/unlocking of IBC by another scissor arm, teamed up with delivery drones 560 and/or 570 capable of IBC placement to and IBC removal from the corner castings of the containers;

a support frame 708 where the robot arms 713 or the foldable IBC manipulator 711 and 712 are mounted;

a source of compressed air 751 either in the form of an air compressor or a reservoir;

a source of electricity and UAV charging station 752 either contact or contactless type, either in the form of electricity generator or battery;

an integrated communication and indoor positioning module including (a) a ground module of telemetry radio capable of setting up telemetry connection, as well as command and control link with air module of telemetry radio integrated into the autopilots on board of traveling UAV at a certain frequency, for example, 915 MHz or 2.4 GHz.

(b) a network of GPS or GNSS receivers and transmitters 754 that are capable of receiving the GPS signal outside the enclosure 702 and transfer the data for providing references to the IPS used by the drone 560 and 570 working inside the envelope, and in compliance with the geofencing system set up in the terminal or yards.

(c) an IPS, indoor positioning system 753 generally includes at least three beacons, three radio signal readers, or three ultrasonic signal readers located within the enclosure and beside the outside GPS with known distances between GPS and IPS, functioning based on triangulation principle, being paired with a time-distance reporter integrated into a controller/transmitter that helps UAVs to precisely control their flying position within the enclosure even when the outside GPS signal is weak due to for example bad weather or GPS shielding by aviation regulation. The IPS, paired with GPS forms a robust positioning system for the UAVs;

lighting unit containing a plurality of lamps based on light-emitting diode (LED), halogen lamps, fluorescents, or the incandescent light bulb for proper monitoring and control of robots and UAVs;

an IBC stand 709 holding a pool of spare IBCs is deployed onboard the IBC mobile workstation for facilitating the pickup and drop off of the IBC. The IBC stand makes sure the dropped and stored IBC is always positioned and oriented the same way as placed in corner casting.

As the aperture 906 in the top 901 of the conventional IBC is always at a predictable position and orientation when it is inserted into the corner casting of the bottom container and when it is fully unlocked, the aperture 906 becomes an ideal grasping point by the delivery drone 560.

Other drone pickup arm arrangements for grasping the IBC are foreseen, employing or assisted by permanent magnets or switching on and off electromagnets powered by onboard battery/tethered electric cable, and controlled either automatically by the drone or by the remote control pilots.

The UAVs or commonly known as drones 560 and 570 are equipped with monitoring cameras 565 and 575. The drone may have a secondary monitor camera 566 mounted at different orientations for monitoring of the ongoing IBC placement and removal.

The flying range of the UAVs is restricted either by a cable attached to the tethered drones or by geofencing. When it is detected that the drone attempts to fly outside the designated territory, the geofencing system will automatically force the drone to land at a safe place controlled by autopilot. The geofencing may define an accessible territory with the same contour as the enclosure 702 to prevent drones from flying outside and to respect other railway or FAA regulations.

The drone is capable of lifting at least one IBC by a gripper 579 or by a hook 569. A dedicated IBC stand 809 is disposed of onboard of the railcar 801 or onboard of the mobile workstation 700 which helps keep consistent location and orientation of each stowed IBC.

Beyond the monitoring camera incorporated in the drones, an additional monitoring system may be provided onboard the IBC mobile workstation 700 to automatically monitor and record the tasks performed.

The chassis 701 and the enclosure are configured to envelop a length of the intermodal train with a cross-section large enough to contain the intermodal railcars carrying double-stacked containers, but small enough so that it can pass through under the platform of the conventional gantry crane employed by the intermodal rail yard to lift the container.

It is foreseen that UAVs onboard the mobile workstation may also be employed to check and inspect the locking status of the IBC on a train and perform other inspection and maintenance tasks in the railway yard.

The wayside IBC mobile workstation travels along the wayside of the track where the intermodal train rests on, causing the enclosure 702, and the entirety of the onboard equipment and support equipment including the robot arms, UAVs, the power sources, the foldable IBC manipulators, etc. travel along from one section of the train to another, performing the IBC related tasks continuously.

FIG. 5A shows that the UAV 560 is equipped with a manipulation rod 568 elastically or rigidly mounted to the UAV. A hook 569 is mounted to the distal end of the rod for easy pick up the IBC 900 by the aperture 906.

FIG. 5B depicts an arrangement of tethered UAVs 570 armed with a pneumatic power tool connected to the source of compressed air by a tethered air hose 759.

As described in FIG. 1, some old version IBC must have its handle 909 turned 5 degrees from the position 909B to 909A to be fully unlocked from the bottom container 830.

As shown in the FIG. 5B, the UAV 570 grasps the IBC with the aid of the rotatable arms 578 and grippers 579, also brings itself with an air spring 572 connected to the source 751 to the IBC 909 to be removed and has the air spring 572 inserted between the handle and the flange 902. As the UAV grasps the IBC firmly by its gripper, the inflated air spring causes the movement of the handle 909 moving from 909B to 909A before it lifts the IBC from the bottom container 810.

Similar embodiments may be realized using UAV of tricopter, the octocopter, and other rotorcrafts type with multiple rotors, although example embodiments of the present invention are provided using the quadcopter and the hexacopter.

The structure members of the mobile base 101, 201, 401 as well as the scissor leg 110, 210, 310, the support frames of the system 400/600, as well as the UAV, are made of any suitable material including but not limited to extruded aluminum alloy profiles or channels, fabricated or pressed aluminum alloys, steel alloys, titanium alloys, magnesium alloys or other metals, plastic or plastic composite, glass fiber reinforced plastic, glass fiber reinforced polymer, carbon fiber reinforced composites, ultra-high molecular weight polyethylene (UHMW) with additives such as carbon black, graphite or fluorocarbon powders, wood, pure fiberglass composite, other suitable composites materials made of a fibrous material embedded within a resin matrix, or a metal foam made out of metal and epoxy glue, etc.

The magnets incorporated into the system 100, 200, 300, 400, 500, and 600 may be any suitable type of permanent magnets, electromagnets, or pneumatic controlled permanent magnets, electro-permanent magnet (electric controlled or operated permanent magnets) that can be switched on or off depending on the required functions. The permanent magnets may be of any suitable types, either in rigid or flexible shape, including but not limited to neodymium iron boron, samarium cobalt, alnico, and ceramic or ferrite magnets, other rare-earth magnets, The lifts incorporated into the system 100, 200, 300, 400, 500, and 600 may be any suitable type of lifts including but not limited to a linear actuator, one stage or multiple-staged telescopic lifting column, aerial lifts including but not limited to articulated boom, telescopic boom, scissor lifts, vertical mast lift, actuated by electric, pneumatic or hydraulic or hybrid power.

The lift and gripper can be powered by an electric battery, hydraulic system, pneumatic compressor, or even a portable compressed liquid, air, or gas reservoir.

The robot manipulators 160, 260, 460, 660, and 713 can be any suitable type including but not limited to the articulated robot, scara robot, delta robot, cartesian robots, cylindrical robots, polar robots, or other types of robot arms. The nature of the control can be pre-programmed, autonomously guided, teleoperated, or even humanoid or augmenting robots, or in a human collaborative manner. The collaborative robot, sometimes also referred to as a service robot regroups all the robots included in one of the four collaboration modes (ISO 10218) including safety monitored stop, hand guiding, speed & separation monitoring, and power and force limiting. The power and force limiting type collaborative robot may have a force threshold to prevent impact with a human, usually integrating force sensors in the robot's joint or external cover, designed to stop when an external force is sensed, for example, over 150N to prevent serious injuries.

The articulated manipulator shown in the figures, in general, can be divided into two sections: the arm consisting of several large and long arms linked by joints, and the wrist consisting of several compact members linked by joints and ending with a tool flange where an end effector is attached. The arm is employed to position the end-effector and workpiece in the manipulator's workspace, while the wrist is used to orient the end effector and the workpiece at the work location.

The mobile robot may be fully autonomous or under the manual remote control of a driver with a joystick or other control device or teleoperated, or line-following car (AGV) or be given a sliding autonomy.

The aerial anchor 150, 450, or 650 may rely on magnetic force or other mechanical grasping or anchoring mechanisms.

The enclosure foreseen can be any suitable combination of flexible and rigid types of material for outdoor uses including but not limited to sail fabrics or membranes commonly used in sailboats, for example, sailcloth such as woven polyester (PET) sailcloth or dacron, nylon-based spinnaker sail fabric, Aramid fiber-based fabric (Kevlar as an example) or Aramid blended with carbon fibers, UHMWPE, Dyneema, Multiple laminated materials, canvas sheet, Fire-retardant polyester, tent fabric such as nylon with PVC, acrylic, polyurethane, or silicone coating, a coated polyester, a polyester-cotton blend.

other waterproof and fire retardant fabrics or composite material.

recycled sailcloth or tent fabrics.

glass fiber reinforced concrete (FRC), fiber-reinforced plastic using glass fiber (fiberglass), other suitable polymers, plastic, suitable metals such as steel, steel alloy or aluminum alloy, architectural strengthened or laminated glass, treated or untreated wood, corrugated sheet in Fiberglass Reinforced Plastic (FRP)/metal/acrylic/polycarbonate, or composites combining the above-mentioned material, lightweight and corrosion-resistant metal sheets, etc.

The gap keepers 156 can be made in any suitable material including but not limited to, polyurethane, other elastomeric or plastic material, or friction brake material. The spring-loaded ball transfers can be made in metal or plastic material.

The robot vision units implemented in the invention can be any suitable type of 2D or 3D system and methodology based on optical geometry-based monocular/binocular camera or the RGB-D camera based on time of flight, with the aid of a lighting system to reduce reflection or shadow in the outdoor environment. The lighting sources may be LED, quartz halogen, Xenon, and fluorescent activated in a continuous or a pulsed flashing or strobing manner.

The present invention can be adapted to applications using different types of railway vehicles, ground vehicles, or marine vessels that use IBCs or other types of twist-locks to secure shipping containers.

Other applications have been envisioned for the above embodiments of the present invention including but not limited to other railcar loading and unloading related operation, railway track work, railway infrastructure construction/maintenance/repair including powerline, signals, and track, railway rolling stock onsite inspection/repair/part replacement including locomotive, freight and/or passenger cars or EMU.

The above invention of a lightweight mobile robot manipulator is foreseen to be adaptable to handle other types of short-range actuation locking mechanisms, for example, "fail-safe" or "fail secure" electric lock, electromagnetic lock, magnetic lock, digital locks, keyless locks based on a short-range radio transmitter such as Bluetooth, WIFI, etc.

The present invention has been described in connection with the preferred and alternate embodiments of the various figures. It is to be understood that other similar embodiments, other combinations of the elements of the present invention may be used, or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A manipulator for manipulating a container connector, the manipulator comprising a controller, a robotic arm with a minimum of four degrees of freedom, an arm base, and a picking tool, the robotic arm being connected to the arm base at one end and the picking tool at the opposite end, the container connector having at least a connector flange, two connector cones, and a handle, the two connector cones being connected and rotatable relative to the connector flange, the container connector being capable of switching at least between a locked state and an unlocked state by rotation of the connector cones relative to the connector flange triggered by a position change of the handle, a container having corner posts and corner castings at the end of the corner posts, the connector cones being capable of fitting into the corner castings, the manipulator being capable of, solely through the movement of the robotic arm, performing the container connector manipulation including locking, unlocking, removal, and installation.

2. The manipulator of claim 1, wherein the picking tool comprises a pair of parallel rods configured to lift the container connector;

wherein the two connector cones are capable of fitting into the corner castings, defining an engaged cone when the connector cone is mounted inside the corner casting and an unengaged cone when the connector cone is free from any engagement, wherein the container connector provides one or more grasp points for the picking tool to lift the container connector when the engaged connector cone is unlocked from the corner casting, (i) an internal grasp point in the form of a through hole in the unengaged connector cone when the unengaged connector cone aligns with the connector flange;

(ii) external grasp points formed by protruding edges on the unengaged connector cone extending beyond the connector flange when the unengaged connector cone is angularly misaligned relative to the connector flange;

wherein the manipulator with the picking tool is capable of lifting the container connector either by inserting one rod into the through hole or by sliding the pair of rods into the spaces beneath the protruding edges;

wherein the manipulator with the picking tool is capable of transitioning the container connector between locked and unlocked states by inserting one rod into the through hole in the unengaged connector cone and rotating the unengaged connector cone, or by changing the position of the handle, solely through the movement of the robotic arm under controller command;

wherein the manipulator with the picking tool is capable of removing or installing the container connector by lifting, relocating, and placing the container connector, solely through the movement of the robotic arm under controller command.

3. The manipulator of claim 2, wherein the picking tool further comprises a safety pin configured to prevent the disengagement of the container connector from the picking tool when the container connector is lifted.

4. The manipulator of claim 2, wherein the pair of rods of the picking tool are round with tapered tips and spaced apart by a distance of between 55 mm and 100 mm, and wherein the picking tool further comprises a third rod configured to maintain the angular misalignment between the unengaged connector cone and the connector flange when the manipulator with the container connector is lifted by the external grasp points.

5. The manipulator of claim 2, wherein the robotic arm is capable of detecting forces and torques acting on the picking tool;

wherein the robotic arm and the picking tool together is capable of performing one or more tests to determine availability of grasp points:

(i) probing for the internal grasp point by advancing one of the two parallel rods in a direction corresponding to an expected through hole and detecting a reaction force indicative of the presence or absence of the through hole, (ii) probing for the external grasp points by advancing the two parallel rods in a direction corresponding to expected spaces beneath the protruding edges and detecting a reaction force indicative of the presence or absence of the protruding edges.

6. The manipulator of claim 1 wherein the picking tool has at least one magnet for applying magnetic lifting force to the container connector.

7. The manipulator of claim 1 wherein the manipulator is capable of traversing different locations for manipulating the container connector, the manipulator further comprising a lift and a workpiece stand, the lift comprising a mobile chassis capable of moving the manipulator around to different locations, a movable support powered by at least one actuator extending from the mobile chassis at one end and connecting to the arm base at the other end, a navigator capable of guiding the manipulator to the container, the navigator having at least one navigation sensor, the lift being capable of aligning the arm base with the corner casting so that the corner casting is positioned, relative to the arm base, within a predefined work location range, the workpiece stand being releasably attached to the lift at a predefined stand location in a substantially fixed position and orientation relative to the arm base, the workpiece stand comprising a plurality of container connector holders capable of securely storing the container connectors in a functionally equivalent manner as they are placed in the corner casting, the container connector holders being arranged at predefined connector holder locations in the workpiece stand and reachable by the robotic arm with the picking tool, the robotic arm with the picking tool being capable of picking the container connector from the corner casting within the work location range, relocating and placing the container connector into one of the container connector holders in the workpiece stand, solely through the movements of the robotic arm, the robotic arm with the picking tool being capable of picking the container connector from one of the container connector holders, relocating and placing the container connector into the corner casting within the work location range, solely through the movements of the robotic arm.

8. The manipulator of claim 7, wherein the manipulator further comprises an anchor stabilizer, the anchor stabilizer being configured to:

releasably link the arm base with either the container or the mobile chassis to form a rigid structure, combine the mass and inertia of either (i) the arm base and the container, or (ii) the arm base, the lift, and the workpiece stand to enhance stability, and stabilize the arm base during the manipulation of the container connector.

9. The manipulator of claim 2, wherein the robotic arm is operable to position and hold the container connector such that gravity contributes to retaining the container connector in engagement with the picking tool during a lifting operation.

10. The manipulator of claim 8, wherein a vibration and shock isolator is mounted in between the arm base and the movable support for reducing transmission of vibration and shock from the lift to the robotic arm when the lift moves between different locations;

wherein the anchor stabilizer comprises a locking assembly configured to secure the arm base in a repeatable and substantially fixed arm base position and orientation relative to the lift, thereby enabling programmed container connector manipulation by the robotic arm;

wherein the anchor stabilizer is deployable when the lift stops, prior to manipulation, and is configured to releasably link the arm base with the mobile chassis, form a rigid structure between the arm base and the mobile chassis;

disable the vibration and shock isolator;

combine the mass and inertia of the arm base, the lift, and the workpiece stand to provide enhanced stability; and stabilize the arm base during the manipulation of the container connector.

11. The manipulator of claim 1 further comprising a lift and a lift mount container connector holder mounted within the lift;

wherein the container is mounted on a railcar;

wherein a railcar mount container connector holder is mounted at a fixed railcar end location;

wherein both the lift mount and the railcar mount container connector holders store the container connectors in a functionally equivalent manner as the container connectors are placed in the corner castings;

wherein the lift comprises a mobile chassis capable of moving the manipulator around to different locations, a movable support powered by at least one actuator extending from the mobile chassis at one end and connecting to the arm base at the other end, a navigator capable of guiding the lift to align the arm base with the corner casting or the railcar mount container connector holder so that the corner casting or the railcar mount container connector holder is positioned, relative to the arm base, within a predefined work location range;

wherein the manipulator is capable of transferring the container connector between the corner casting within the work location range and the lift mount container connector holder in a reversable manner, solely through the movements of the robotic arm;

wherein the manipulator is capable of transferring the container connector between the lift mount container connector holder and the railcar mount container connector holder in a reversable manner, solely through the movements of the robotic arm.

12. The manipulator of claim 7 has one enclosure at least partially enveloping the container, the container connector, a workspace where the robotic arm manipulates the container connector, to create a sheltered environment for reliable container connector manipulation independent of environmental condition at the different locations.

13. The manipulator of claim 7, wherein container connector holder and the container connector stored therein together form a connector storage unit, wherein the workpiece stand is capable of stacking and holding a plurality of the connector storage units, the container connectors being placed in the two adjacent container connector holders in a manner functional equivalent to installation in the corner castings of stacked containers.

14. The manipulator of claim 7 wherein each container connector holder includes at least one magnet to restrict motion relative to the workpiece stand and the container connector holder, and reduce vibration and shock related damages during lift movement.

15. The manipulator of claim 1, wherein the manipulator has at least a sensor capable of detecting the geometries of the container and the container connector, wherein the manipulator, using predefined geometries stored in the controller about the container and the container connector, and the inputs from the sensor, is capable of detecting (i) the state of the container connector, and (ii) the position and orientation of the container connector including the handle, the connector cone, and the connector flange, relative to the corner casting and the arm base.

16. The manipulator of claim 7, wherein the workpiece stand is detachable from the lift, replaceable as a unit, and repositionable in a repeatable manner to the fixed workpiece stand position and orientation;

wherein the manipulator comprises at least one workpiece stand locking assembly to releasably secure the workpiece stand to the lift;

wherein the robotic arm and the picking tool is capable of performing an action comprising activating or deactivating the workpiece stand locking assembly to transition the system between a secured and unsecured state, solely through the movements of the robotic arm.

17. The manipulator of claim 7, wherein the container is mounted on a railcar, the railcar being equipped with an automatic equipment identification tag;

wherein the manipulator is capable of identifying the railcar type based on detection of the automatic equipment identification tag;

wherein the navigator, using stored geometries of the railcar, the container, and inputs from the navigation sensor, is configured to guide the manipulator to align with the corner casting of the container onboard the railcar.

18. The manipulator of claim 17, wherein the stored geometries include a standard distance from a center pin of the railcar to a nearest corner post of the container;

wherein the center pin is located substantially at the midpoint between adjacent wheels on each side of the railcar;

wherein the vision sensor or LIDAR is capable of detecting the midpoint to locate the center pin;

wherein the manipulator is capable of aligning with the corner casting by first identifying the center pin, then moving the standard distance.

19. The manipulator of claim 16, wherein the manipulator is capable of replacing the workpiece stand as a unit by detaching the workpiece stand from the rest of the manipulator including the controller, the robotic arm, the arm base, the picking tool and the lift, lowering and releasing the workpiece stand on top of a support stand, withdrawing the rest of the manipulator from the support stand, lifting a second workpiece stand on top of a second support stand, and locking the second workpiece stand with the lift.

20. The manipulator of claim 7, wherein the robotic arm stores the container connector in the container connector holder with the handle oriented substantially away from the arm base, thereby providing improved access for the robotic arm and the picking tool around the container connector and enabling efficient, high density storage of multiple container connectors within a limited space accessible by the robotic arm and the picking tool.

* * * * *